US012689568B2

(12) United States Patent
Tayeb et al.

(10) Patent No.: US 12,689,568 B2
(45) Date of Patent: Jul. 21, 2026

(54) TELEMETRY REDUNDANT MEASUREMENT AVOIDANCE PROTOCOL

(71) Applicant: Intel Corporation, Santa Clara, CA (US)

(72) Inventors: Jamel Tayeb, Hillsboro, OR (US); Chansik Im, Portland, OR (US); Praveen S. Polasam, Huntersville, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/899,840

(22) Filed: Aug. 31, 2022

(65) Prior Publication Data

US 2022/0417117 A1      Dec. 29, 2022

(51) Int. Cl.
 *H04L 43/02* (2022.01)
 *H04L 43/04* (2022.01)
 *H04Q 9/00* (2006.01)

(52) U.S. Cl.
 CPC .............. *H04L 43/02* (2013.01); *H04L 43/04* (2013.01); *H04Q 9/00* (2013.01)

(58) Field of Classification Search
 CPC ........... H04Q 9/00; H04L 43/02; H04L 43/04; H04L 41/28; H04L 43/12
 See application file for complete search history.

(56) References Cited

PUBLICATIONS

"Telemetry Standards", IRIG Standard 106-19, Secretariat Range Commanders Council Telemetry Group (Jul. 2019), http://www.irig106.org/docs/106-19/106-19_Telemetry_Standards.pdf.
"EMON User Guide", Intel Corp., 24 pages (Feb. 1, 2019).
"Getting Started with Telemetry Monitoring", Intel Corp., 7 pages (Apr. 23, 2021), https://www.intel.com/content/dam/www/central-libraries/US/en/documents/telemetry-eguide.pdf.
Frederico Araujo et al., "SysFlow Telemetry Pipeline", Release 0.4, 81 pages (Jun. 1, 2022).
"Intel ®VTune™ Profiler User Guide", Intel Corp., 881 pages (Jun. 2, 2022), https://www.intel.com/content/dam/ develop/external/us/en/documents/vtune-profiler-user-guide.pdf.

*Primary Examiner* — Brian Whipple
(74) *Attorney, Agent, or Firm* — Hanley, Flight & Zimmerman, LLC

(57) ABSTRACT

The present disclosure describes a telemetry redundant measurement avoidance protocol (TRMAP) that solves redundant data collection problems in telemetry systems. The TRMAP can operate in a non-supervised environment and/or in a distributed manner, and does not require a central controller to manage multiple collection agents in one or multiple telemetry systems. The TRMAP can also be an opt-in-based protocol that favors altruistic data sharing and reuse between collection agents. In these ways, the TRMAP provides freedom and collaboration among developers or other entities that desired telemetry data, while allowing non-compliant collection agents to coexist, if possible.

25 Claims, 8 Drawing Sheets

```
850
        856
                                    acceleration                    connected
  processor 852                     circuitry 864                   devices 862
    PMU(s) 852p
                          866            866y
    instructions 881
                                866x                                edge cloud
  trusted execution                      866z                          863
  environment 890

860                         network
                                    interface 868
  memory 854
                                    external           sensors 872
    instructions 882                interface 870
                                                       actuators 874
  storage 858                       battery 826
                                                       pos 875
    instructions 883
                                    battery
                                    monitor /
  output circuitry 884              charger 828        power block 880 input circuitry 886
```

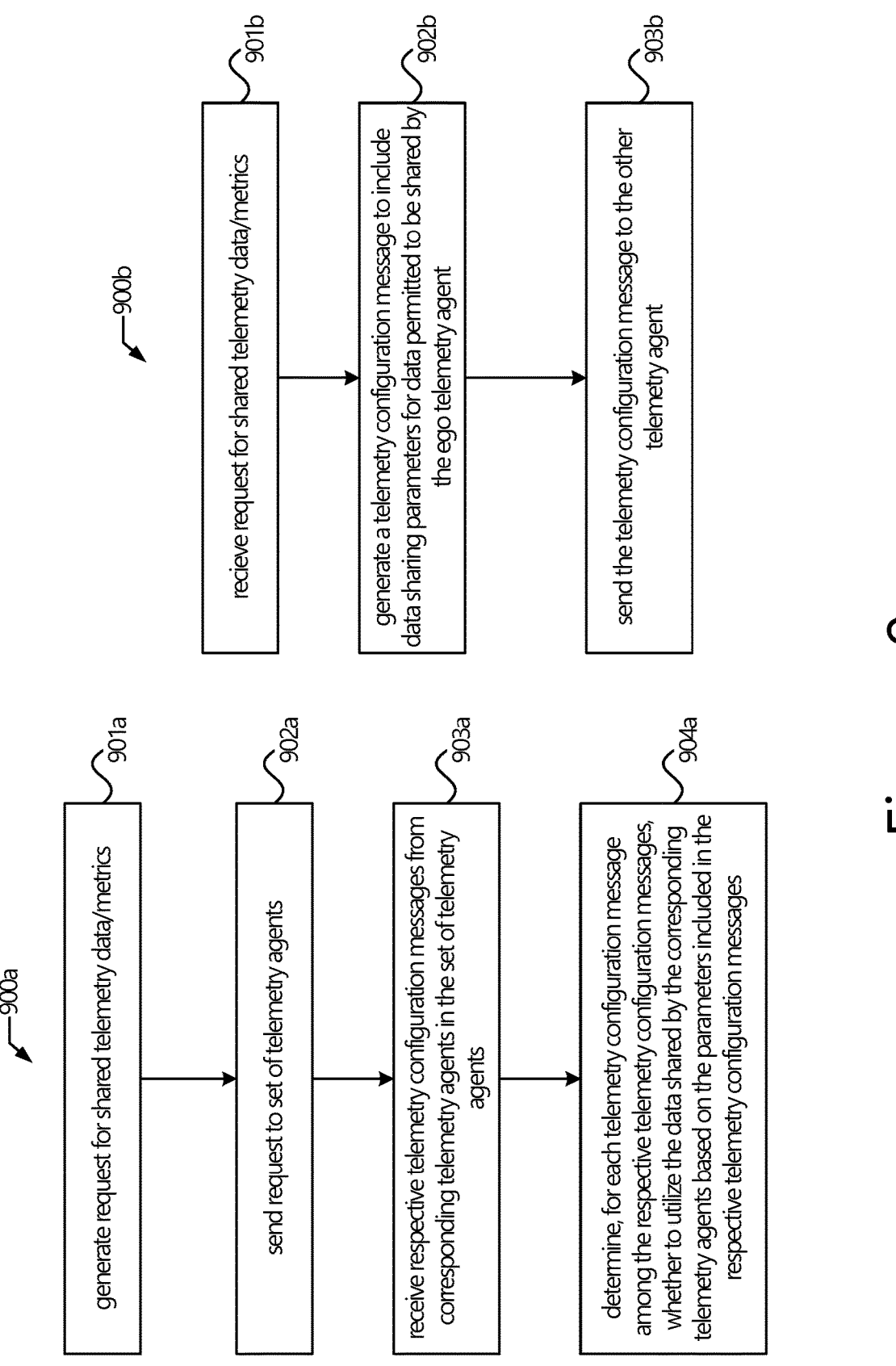

901a — generate request for shared telemetry data/metrics

902a — send request to set of telemetry agents

903a — receive respective telemetry configuration messages from corresponding telemetry agents in the set of telemetry agents 904a — determine, for each telemetry configuration message among the respective telemetry configuration messages, whether to utilize the data shared by the corresponding telemetry agents based on the parameters included in the respective telemetry configuration messages 900b 901b — recieve request for shared telemetry data/metrics 902b — generate a telemetry configuration message to include data sharing parameters for data permitted to be shared by the ego telemetry agent 903b — send the telemetry configuration message to the other telemetry agent

TELEMETRY REDUNDANT MEASUREMENT AVOIDANCE PROTOCOL

TECHNICAL FIELD

The present disclosure is generally related to telemetry, edge computing technologies (ECTs), cloud computing technologies, compute system usage, and in particular, to a telemetry redundant measurement avoidance protocol and related technologies.

BACKGROUND

Telemetry refers to the in situ collection of measurements or other data at remote points, and the use of such data for monitoring and/or analysis. Telemetry used for data-driven decision making can suffer from issues based on multiple agents competing for the same uniquely measurable information, which can negatively impact system performance and/or resource consumption overhead, and can result in non-optimal decisions being made.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which:

FIG. 9 illustrates an example process for practicing aspects of the present disclosure.

DETAILED DESCRIPTION

Figure 1:
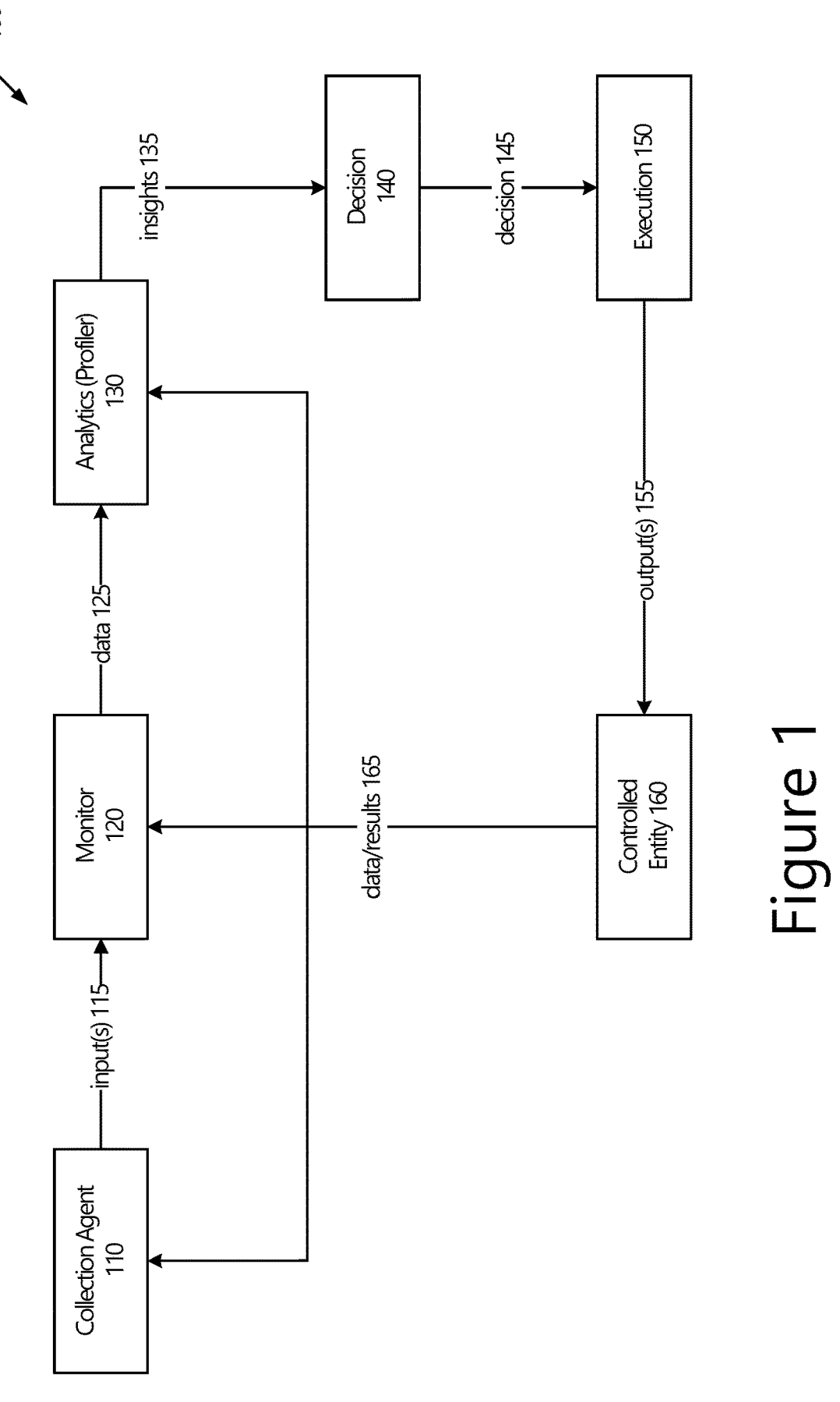
FIG. 1 depicts an example telemetry and profiling architecture.

1. Telemetry Redundant Measurement Avoidance Protocol Aspects

Telemetry refers to the in situ collection of measurements, metrics, and/or other data (referred to as "telemetry data" or the like) at one device, and the automatic communication of the telemetry data to another device for some purpose, usually for monitoring and/or analysis of the telemetry data. The telemetry data can be conveyed using any suitable communication means including wireless data transfer mechanisms (e.g., radio, ultrasonic, infrared, and so forth) and/or wired data transfer mechanisms (e.g., telephone, computer network, copper wires, optical links, power line carriers, and so forth). Telemeters are physical devices used in telemetry systems, which may include event capture means (e.g., sensor circuitry 872, actuators 874, input circuitry 886, output circuitry 884, and/or other components of FIG. 8) and one or more communication means (e.g., communication circuitry 866 and/or positioning circuitry 845 of FIG. 8). Telemeters can also have other components such as output means (e.g., display device, output circuitry 884 of FIG. 8, and/or the like), recording means (e.g., input circuitry 886, processor circuitry 852, and/or memory circuitry 854 of FIG. 8), and/or control means (e.g., processor circuitry 852 and/or memory circuitry 854 of FIG. 8). Telemeters can also include other technologies such as mechanical, hydraulic, and optical mechanisms.

Performance analysis tools (also referred to as "profilers", "analytics tools", "performance counters", "performance analyzers", and/or the like) are tools that analyze data and provide a statistical summary or other analysis of observed events (referred to as a "profile") and/or a stream of recorded events (referred to as a "trace"). Profilers may use a number of different analysis techniques, such as event-based, statistical, instrumented, and simulation methods. The profiling information (e.g., profile and/or traces) can be used for performance prediction, performance tuning, performance optimization, power savings (e.g., optimizing performance while avoiding power throttling and/or thermal-related throttling), and/or for other purposes. Profilers use a wide variety of techniques to collect data including, for example, hardware interrupts, code instrumentation, instruction set simulation, hooks, performance counters, timer injections, and telemetry mechanisms.

Telemetry used for data-driven decision can involve situations where multiple access agents compete for the same uniquely measurable information. In current systems, telemeters and/or performance analysis tools assume that they have exclusive access to a system, device, or component. However, in complex environments and/or field deployments, multiple collection agents have access to the same resources and may attempt to access the same resource at the same time. For example, for a consumer-level end user device, an original equipment manufacturer (OEM), a chip manufacturer, an operating system (OS) developer, and individual application (app) developers may each have their own telemetry agents collecting data from the user device, which can include collecting the same data/metrics from the same components and/or subsystems of the user device. The complexity of these scenarios is also increased by use of orchestration for code placement, service automation, and/or delivery of data, which often uses its own source of telemetry to provide these services. Applications and/or services can also access system resources to make decisions about their behaviors (e.g., features made available, precision of computed results, and the like).

As a result, redundant measurements are often collected, which can cause increases in resource consumption, energy consumption, data size, data traffic, and so forth. In some scenarios, multiple collection agents attempting to collect or access the same data from the same data sources can result in race conditions and/or cause some collection agents to be excluded from accessing a data source, which can lead to catastrophic system failures or crashes, system instability, and/or other errors.

In some cases, race conditions and/or competition among multiple collection agents to access the same data source at the same time (or nearly the same time) can result in some collection agents being unable to access the data source because another collection agent is currently accessing that data source. Most data sources do not have protected access or arbitration mechanisms (e.g., access control list, privileges, and the like) to manage the access to individual data sources by multiple collection agents. Some shared memory systems include concurrent access arbitration mechanisms, which is often handled at the memory controller level according to an arbitration policy. The choice of arbitration policy is usually based on memory client requirements, which may be diverse in terms of bandwidth and/or latency.

However, existing memory arbitration schemes can introduce resource usage overhead. Moreover, these shared memory arbitration mechanisms are usually implemented at the HW-level, and these arbitration schemes are difficult to implement in telemetry systems due to the multiple entities involved in telemetry systems (e.g., OEMs, chip manufacturers, OS developers, individual app developers, network operators, among many others). Additionally, although access arbitration mechanisms can allow multiple agents to access a particular resource, these mechanisms do not manage the resource itself.

Furthermore, competition among multiple collection agents to collect the same data from the same data source can result in skewed or corrupted data being collected. For example, a HW element may be originally designed to collect a first type of data from a first data source, but sometime later is reprogrammed by another entity to collect a second type of data and/or collect data from a second data source. A collection agent who is relying on the original programming of the HW element may not be notified of the reprogramming, and therefore, may end up making erroneous decisions based on the different type of data being collected and/or data being collected from a different source.

The present disclosure describes a telemetry redundant measurement avoidance protocol (TRMAP) that solves telemetry redundant data collection problems such as those discussed previously. TRMAP is a protocol that collection agents (e.g., telemeters, performance analysis tools, smart SW, AI/ML algorithms and/or models, orchestrators, and the like) can implement to avoid redundant data collection and associated drawbacks (e.g., overhead, system failures, slowdowns, collecting incorrect data, and the like), while having access to the data needed to derive their insights using data analysis techniques. In TRMAP, an ego collection agent (also referred to as "subject collection agent", "requestor agent", "subject telemeter", and/or the like) can request or otherwise obtain telemetry manifests (or parameters of such manifests) from other TRMAP collection agents. An agent's telemetry manifest includes various parameters such as, for example, collection attributes, measurement types, exclusive nature of measurement(s), storage location(s) for storing and/or exposing collected measurements/metrics, communication mechanisms, sharing permissions, and/or the like. The ego agent uses these manifests (or parameters of such manifests) to decide if it can use data/metrics collected by other collection agents and/or whether it should relinquish its own collection mechanisms for certain data/metrics. In some cases, an agent may relinquish data collection to avoid conflicting or competing accesses to measurement resources, because conflicting or competing accesses to measurement resources could lead to system failures and/or erroneous data collection. The decision to relinquish data collection could be based on a network-wide configuration or policy such as, when the same or similar data is collected by multiple other agents deployed on multiple other systems. Using these manifests (or parameters of such manifests), the ego agent decides or determines, for each metric the ego agent collects and/or for each data source from which a metric is collected, whether it should relinquish measurement collection and reuse the data shared by another agent, and whether it should persist measuring/collecting the metric. In these ways, TRMAP allows for informed and altruistic data collection.

In some implementations, TRMAP operates in a non-supervised environment and/or in a distributed manner, which does not require an orchestrator, arbiter, or central controller. In these implementations, the TRMAP is an opt-in-based protocol that favors altruistic data sharing and reuse among collection agents. Additionally or alternatively, middleware, enterprise-level applications, and/or security mechanisms can be employed to enforce the TRMAP. In such implementations, the middleware, enterprise-level applications, and/or security mechanisms may reside outside of the TRMAP layer/entity. In these ways, the TRMAP provides flexibility to collection agents as well as policing and/or disfavoring non-compliant agents, if and when needed. Moreover, TRMAP requires very little or no human configuration, and can be easily implemented in existing SW frameworks and/or as a firmware (FW) layer in existing systems. The opt-in nature of the TRMAP also allows individual developers, OEMs, or other entities to decide the type and amount of data to share with others.

FIG. 1 illustrates an example telemetry and profiling service (TPS) 100. The TPS 100 can be used to monitor systems and/or optimize performance of such systems. The TPS 100 includes a collection agent 110 (also referred to as "collector 110") that measures and/or collects measurements, metrics, and/or observations, and provides input(s) 115 to a monitoring function 120. The collector 110 may be one or more telemeters in a telemetry system, a system under test (SUT), device under test (DUT), and/or some other suitable data producer(s). The collector 110 collects, samples, or oversamples various measurements, metrics, and/or observations in response to detecting one or more events, according to one or more timescales, during one or more time periods or durations at one or multiple timescales, or based on one or more predetermined or configured conditions. In some examples, the concept of timescales relates to an absolute value of an amount of data collected during a duration, time segment, or other amount of time. Additionally or alternatively, the concept of timescales can enable the ascertainment of a quantity of data. For example, first metrics/measurements may be collected over a first time duration and second metrics/measurements may be collected over a second time duration. For the TPS 100 to act on input(s) 115 in the context of a set goal, the TPS 100 provides may continuously consume and produce information from each other in a loop according to the sequence of monitoring 120, analysis 130, decision 140, and execution 150.

The input(s) 115 are provided by the collector 110 to the monitoring function 120, and the monitoring function 120 passes data 125 to an analytics function 130 (also referred to as a "profiler 130", "analytics tool 130", or the like). The data 125 can include the input(s) 115 without processing being applied, and/or the input(s) 115 with some filtering or other processing applied.

As examples, the input(s) 115 and/or the data 125 can include system-based metrics such as for example, assists (e.g., FP assists, MS assists, and the like), available core time, average bandwidth (BW), core frequency, core usage, frame time, latency, logical core utilization, physical core utilization, effective CPU utilization, effective physical core utilization, effective time, elapsed time, execution stalls, task time, back-end bound, memory BW, contested accesses (e.g., intra-compute tile, intra-core, and/or the like), cache metrics/measurements for individual cache devices/elements (e.g., cache hits, cache misses, cache hit rate, cache bound, stall cycles, cache pressure, and the like), pressure metrics (e.g., memory pressure, cache pressure, register pressure, and the like), translation lookaside buffer (TLB) overhead (e.g., average miss penalty, memory accesses per miss, and so forth), input/output TLB (IOTLB) overhead, first-level TLB (UTLB) overhead, port utilization for individual ports, BACLEARS (e.g., fraction of cycles lost due to the Branch Target Buffer (BTB) prediction corrected by a later branch predictor), bad speculation (e.g., cancelled pipeline slots, back-end bound pipeline slots), FP metrics (e.g., FP arithmetic, FP assists, FP scalars, FP vector, FP x87, and the like), microarchitecture usage, microcode sequencer (MS) metrics, GPU metrics, OpenCL™ kernel analysis metrics, energy analysis metrics, user interface metrics, and/or any other metrics such as those discussed herein and/or those discussed in Intel® VTune™ Profiler User Guide, INTEL CORP., version 2022 (2 Jun. 2022) ("[VTune]"), the contents of which are hereby incorporated by reference in its entirety. Additionally or alternatively, the input(s) 115 and/or the data 125 can include performance measurements (see e.g., 3GPP TS 28.552 v17.7.1 (Jun. 17, 2022) ("[TS28552]"), the contents of which are hereby incorporated by reference in its entirety), key performance indicators (KPIs) (see e.g., 3GPP TS 28.554 v17.7.1 (Jun. 17, 2022) ("[TS28554]"), the contents of which are hereby incorporated by reference in its entirety), performance threshold monitoring events (see e.g., 3GPP TS 28.532 v17.1.0 (Jun. 16, 2022) ("[TS28532]"), the contents of which are hereby incorporated by reference in its entirety), and/or fault supervision events (see e.g., [TS28532]). Additionally or alternatively, the input(s) 115 and/or the data 125 can include any of the measurements/metrics discussed herein; network identifiers (IDs), session IDs, application instance IDs, and/or the like (including any of those discussed herein); and/or any other type of data such as any of those discussed herein.

Additionally or alternatively, the input(s) 115 and/or the data 125 can include security and/or resiliency related events such as, for example, voltage drops, a memory error correction rate being above a threshold, thermal events (e.g., temperature of a device or component exceeding a threshold), detection of physical SoC intrusion (e.g., at a sensor or other component), vibration levels exceeding a threshold, and/or the like. Additionally or alternatively, the input(s) 115 and/or the data 125 can include performance extrema events such as, for example, loss of heartbeat signals for a period of time, timeouts reported from hardware (HW) elements (e.g., due to congestion or loss of a wakeup event following a blocking I/O operation), and/or the like.

The analytics function 130 analyzes the data 125, and generates insights 135 (also referred to as "profile(s) 135", "trace(s) 135", and/or the like) based on the data 125. The analytics function 130 provides the insights 135 to a decision function 140. In some examples, the analytics function 130 analyzes or otherwise determines variations in data that are collected over the same or different timescales and/or based on different triggering events and/or conditions, which may be maintained separately in memory/storage according to the event or condition causing the measurement/collection, the timescale over which they are collected, and/or according to any other predefined or configured criteria.

The decision function 140 determines and/or generates a decision 145 (also referred to as "prediction(s) 145", "inference(s) 145", and/or the like) based on the insights 135, and provides the decision 145 to the execution function 150. Here, the decision 145 can include one or more actions, policies, tasks, operations, and/or performance optimizations. The execution function 150 generates one or more outputs 155, and provides those output(s) 155 to the controlled entity 160. In various implementations, the execution function 150 executes and/or otherwise performs one or more actions based on the decision 145. Additionally or alternatively, various other output(s) 155 may be provided to the controlled entity 160 at some interval and/or on-demand. Results and/or data 165 based on the output(s) 155 is/are provided to the collector 110, the monitoring function 120, and/or the analysis function 130, and the process continues in an iterative and/or continuous fashion.

Examples of the input(s) 115 and/or the output(s) 155 can include goals, policies, configurations, and/or actions. A goal is a desired result or outcome, and is usually set within certain parameter boundaries, such that the TPS 100 can automatically adjust one or more actions and/or output(s) 155 based on the input(s) 115 within the specified parameter boundaries. The policies may include a set of guidelines or rules intended to achieve a desired outcome, and may be used for decision making by the decision function 140 and/or other purposes.

A configuration may be an arrangement of one or more functional units and/or a data resource and/or a set of parameters used to set various settings of a system, device, component, and/or other element(s). In some implementations, a configuration includes a set of capabilities that allow a consumer or other entity to govern and/or monitor the controlled entity 160, including, for example, lifecycle management (e.g., including creating, modifying, activating and/or deactivating, and deleting and/or terminating the controlled entity 160), configuring goals for the controlled entity 160, monitoring goal fulfillment of the controlled entity 160, and/or the like. Additionally or alternatively, the configuration(s) can include or indicate various control parameters such as, for example, settings, parameters, and/or one or more actions to be taken based on indicated input(s) 115, data 125, insight(s) 135, and/or decision(s) 145.

An action may include an instruction, command, or indication of how a system, device, component, or other element/entity should be changed, or has been changed. Examples of the actions includes adjusting the number of processor cores and/or processing devices allocated to a particular workload, adjusting a core frequency, adjusting an uncore frequency, adjusting cache allocations, adjusting one or more HW and/or software (SW) configuration parameters that affect execution of a workload, adjusting one or more configuration parameters such as an of those discussed herein, causing an output, causing an actuation element to change a state, causing signaling, and/or any other action(s) such as any of those discussed herein. Additionally or alternatively, the control actions can be application specific such as, for example, adjusting the number of buffers used for one part of a packet processing pipeline and/or the like. The adjustment, alteration, and/or tuning of resources and/or services is completed by the continuous iteration of the steps in the TPS 100.

In various implementations, the goals, policies, configurations, actions, and/or individual parameters of the goals, policies, configurations, and/or actions can be updated from time to time via suitable request messages that are input(s) 115 to the TPS 100. Additionally or alternatively, the output(s) 155 and/or actions can be used to adjust one or more parameters, characteristics, goals, policies, configurations, and/or actions.

In some implementations, the input(s) 115, output(s) 155, and/or results data 165 include data concerning the controlled entity 160 such as, for example, resources used by the controlled entity 160 and/or other device or system, service key performance indicators (KPIs) of the controlled entity 160 and/or other device or system (e.g., which is/are monitored by the monitoring function 120, analyzed by the analytics function 130, and so forth), and/or the like. Additionally or alternatively, the input(s) 115 and/or results data 165 can include ML model parameters for a suitable ML algorithm/model such as those discussed herein. In some examples, the ML model parameters and/or ML weights/biases can be provided via input(s) 115. In some implementations, the output(s) 155 can include, for example, control statuses (e.g., results of various control governance and/or control management commands/actions, and/or the like), updated/adjusted goals, policies, configurations, actions, and/or updated/adjusted parameters of goals, policies, configurations, and/or actions.

In some examples, the controlled entity 160 is embodied as a computing device, the collector 110 includes one or more sensors in the computing device or otherwise accessible to computing device, and the outputs(s) 155 are actions to alter or adjust various operational parameters of the computing device to optimize performance of the computing device or the system to which the computing device belongs. For example, the controlled entity 160 may be a processor or individual processor core (see e.g., processor circuitry 852 of FIG. 8 discussed infra) and the collector 110 (or telemeter) is a performance monitoring unit (PMU) implemented by the processor or processor core (see e.g., PMU 852p of FIG. 8 discussed infra).

Figures 7, 8:
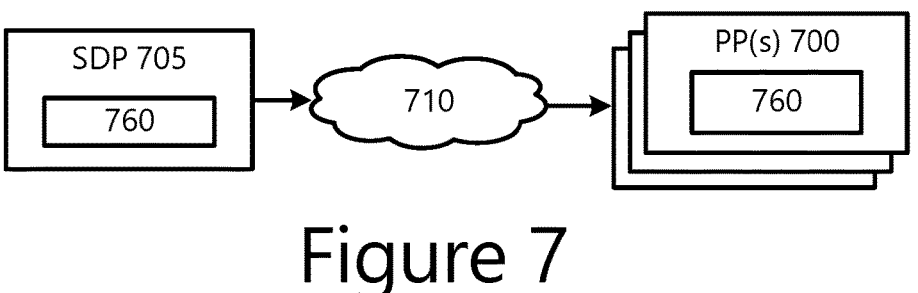
FIG. 7 illustrates an example software distribution platform.
FIG. 8 depicts example components of a compute node.

Additionally or alternatively, the collector 110 can include one or more sensors in the computing device or system such as, for example, digital thermal sensors (DTS) of respective processors/cores, thermal sensor on-die (TSOD) of respective dual inline memory modules (DIMMs), baseboard thermal sensors, and/or any other sensor(s) such as those discussed herein (see e.g., sensor circuitry 872 of FIG. 8 discussed infra). Additionally or alternatively, the collector 110 can include other components of the computing system such as, for example, host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (IIO), and interconnect (IX) link interfaces and/or controllers), and/or any other components such as any of those discussed herein. Additionally or alternatively, the collector 110 can provide other conditions and/or performance information from various components such as those discussed herein.

In some examples, the collector 110 is embodied as a daemon or collection element (e.g. Telegraf and/or the like) that collects various platform and/or HW metrics from computers (e.g., edge compute nodes, cloud compute nodes/clusters, workstations, and/or the like) and/or network equipment, and the monitor 120 is a metrics aggregator (e.g., cAdvisor, StatsD, collectd and/or the like) and/or metrics monitoring tool (e.g., Prometheus, Grafana, and/or the like). Additionally or alternatively, collectors 110 and/or the monitor 120 (and/or any of the other functions 130, 140, 150, 160) may be embodied as an OpenTelemetry (OTel) collector, which may be part of an observability framework (see e.g., OpenTelemetry Specification, version 1.12.0 (10 Jun. 2022), https://opentelemetry.io/docs/reference/specification/); SysFlow containers, processes, and/or files (see e.g., Araujo et al., SysFlow Telemetry Pipeline, release 0.4 (1 Jun. 2022)); Datadog Agent (see e.g., Datadog Docs (accessed August 2022), https://docs.datadoghq.com/); and/or the like. Additionally or alternatively, collectors 110 running on a compute node (e.g., edge compute nodes and/or cloud compute nodes) are configured to collect platform metrics and are deployed as privileged containers, using host networking.

In some examples, the collector 110 can represent multiple machines (e.g., millions or tens of millions) from which data is collected on a daily basis, and the analytics function 130 and/or the decision function 140 is/are telemetry tools and/or performance analysis tools used to make decisions to improve the design, HW configurations, and performance of future HW components, systems, and/or network arrangements. In these examples, the execution function 150 and/or the controlled entity 160 can be computer-aided design (CAD) tools, computer-aided modeling tools, computer-aided manufacturing tools, computer-aided engineering (CAE) tools, PCB layout tools, circuit simulators, finite element analysis (FEA) tools, and/or other like tools or systems.

In some implementations, each of the functions 110, 120, 130, 140, 150, 160 are implemented by respective physical compute nodes connected to one another using one or more communication technologies such as any of those discussed herein. Additionally or alternatively, each of the functions 110, 120, 130, 140, 150, 160 are implemented as respective network functions (NFs) and/or respective application functions (AFs). Additionally or alternatively, each of the functions 110, 120, 130, 140, 150, 160 are implemented as, or operate within respective virtualization containers and/or respective virtual machines (VMs). In other implementations, each of the functions 110, 120, 130, 140, 150, 160 is implemented by a single virtual or physical computing device/system. In either of the aforementioned implementations, some or all of the functions 110, 120, 130, 140, 150, 160 is/are operated by separate processing elements/devices within one or more virtual or physical computing devices/systems. Additionally or alternatively, some or all of the functions 110, 120, 130, 140, 150, 160 are operated by a single processing element.

In one example implementation, one or more stream processors are used to operate one or more of the functions 110, 120, 130, 140, 150, 160. The stream processor(s) process data directly as it is produced or received, and detect conditions from the data streams within a relatively small time period (e.g., measured in terms of microseconds to minutes). The stream processor(s) can be implemented as software components (e.g., software engines, software agents, artificial intelligence (AI) agents, modules, objects, or other like logical units), as individual hardware elements (e.g., general-purpose processing elements and/or special-purpose processing elements), or a combination thereof. In an example software-based implementation, the stream processor(s) are developed using a suitable programming language(s) and/or development tools/environments, which are executed by one or more processors of one or more computing systems (see e.g., processor circuitry 852 of FIG. 8). In this example, logic and/or program code of the stream processor(s) may be executed by a single processor or by multiple processing devices. In an example hardware-based implementation, the stream processor(s) are implemented by respective hardware elements, such as GPUs (or floating point units within one or more GPUs), hardware accelerators (e.g., FPGAs, ASICs, DSPs, SoCs, digital signal controllers (DSCs), etc.) that are configured with appropriate logic blocks, bit stream(s), etc. to perform their respective functions, AI accelerating co-processor(s), tensor processing units (TPUs), and/or the like. In some examples, the stream processor(s) may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AG®, StreamC™ from Stream Processors, Inc., and/or the like. In some implementations, the stream processor(s) may implement or operate VMs, virtualization containers, or other suitable runtime environment(s) in which various packet processing applications, telemetry systems, profilers, performance analysis applications, and/or other applications can be executed.

In various implementations, the input(s) 115, data 125, insights 135, decision(s) 145, output(s) 155, and results data 165, can be expressed as one or more attributes and/or parameters, and/or using suitable data structure(s) and/or information object(s) (e.g., electronic documents, files, packages, and/or the like). Additionally or alternatively, the TPS 100 can include one or more signaling or communication technologies for transferring or otherwise conveying information between the various functions 110, 120, 130, 140, 150, 160. In one example, the functions 110, 120, 130, 140, 150, 160 can communicate with one another using one or more of API(s), web service(s), middleware, SW connectors, file transfer mechanisms discussed (see e.g., 3GPP TS 28.550 v17.1.0 (Jun. 16, 2022) ("[TS28550]") the contents of which are hereby incorporated by reference in its entirety), data streaming mechanisms (see e.g., [TS28550]), notification mechanisms (see e.g., 3GPP TS 28.545 v17.0.0 (Jun. 24, 2021) ("[TS28545]"), the contents of which are hereby incorporated by reference in its entirety), Telemetry Network Standards (TmNS) standards (see e.g., Telemetry Standards, WIG Standard 106-19, Secretariat Range Commanders Council Telemetry Group (July 2019), the contents of which are hereby incorporated by reference in its entirety), and/or any other mechanisms such as those discussed herein, and/or any combination thereof.

FIGS. 2-5 show example operation of the TRMAP. Each of FIGS. 2-5 includes a system 200 that includes multiple collection agents 210a, 210b, 210c, and 210r (collectively referred to as "agents 210" or "agent 210"). The collection agents 210 (also referred to as "access agents 210", "telemetry agents 210", or the like) may be the same or similar as the collector 110 of FIG. 1, or may be a combination of the collector 110 and the monitoring function 120 of FIG. 1. The agents 210 include respective collection configurations 211a, 211b, 211c, 211r (collectively referred to as "collection configurations 211" "collection configuration 211", and/or the like) that define or otherwise specify various data/metrics collection parameters and/or characteristics, and in some implementations, may specify the data/metrics that an agent 210 is willing to share with other agents 210 and/or the data/metrics of one or more data sources from which an agent 210 is willing to share. As examples, a collection configuration 211 (also referred to as a "telemetry configuration 211", "manifest 211", or the like) can specify one or more of a set of data types and/or metrics to be collected, a set of data sources from which to collect or otherwise access the data/metrics; a set of time periods or intervals when data collection is to take place (or time periods/intervals when data collection process(es) are triggered or initiated); triggers, conditions, and/or events for starting or initiating data collection process(es); telemetry system information and/or telemetry pipeline information;

sharing permissions; local and/or remote data storage locations for storing collected data; and/or other like parameters and/or data. The manifests 211 and/or the various messages (e.g., messages 204, 311, 411, and the like) may be embodied as any suitable information object and/or with any suitable data format or data structure such as any of those discussed herein.

In the examples of FIGS. 2-5, configuration 211a for agent 210a indicates that agent 210a collects data A0, A1, and A2, and shares data A1; configuration 211b for agent 210b indicates that agent 210b collects data B0 and B1, and does not share data (e.g., agent 210b has not opted-in to participate in the TRMAP); configuration 211c for agent 210c indicates that agent 210c collects data C0, C1, C2, and C3, and shares data C1 and C2; and the configuration 211r for agent 210r indicates that agent 210r collects data A0, C1, B0, and X0. In the following discussion, agents 210a, 210b, and 210c may be referred to as "sharing agents 210" because they are being asked to share their collected data/metrics, and agent 210r may be referred to as a "requesting agent 210r" or "requestor 210r" because it is asking to access shared data/metrics. However, it should be noted that any of the agents 210 may act as sharing agents or requesting agents. Additionally, there may be many more agent 210 than depicted by FIGS. 2-5.

Figure 2:
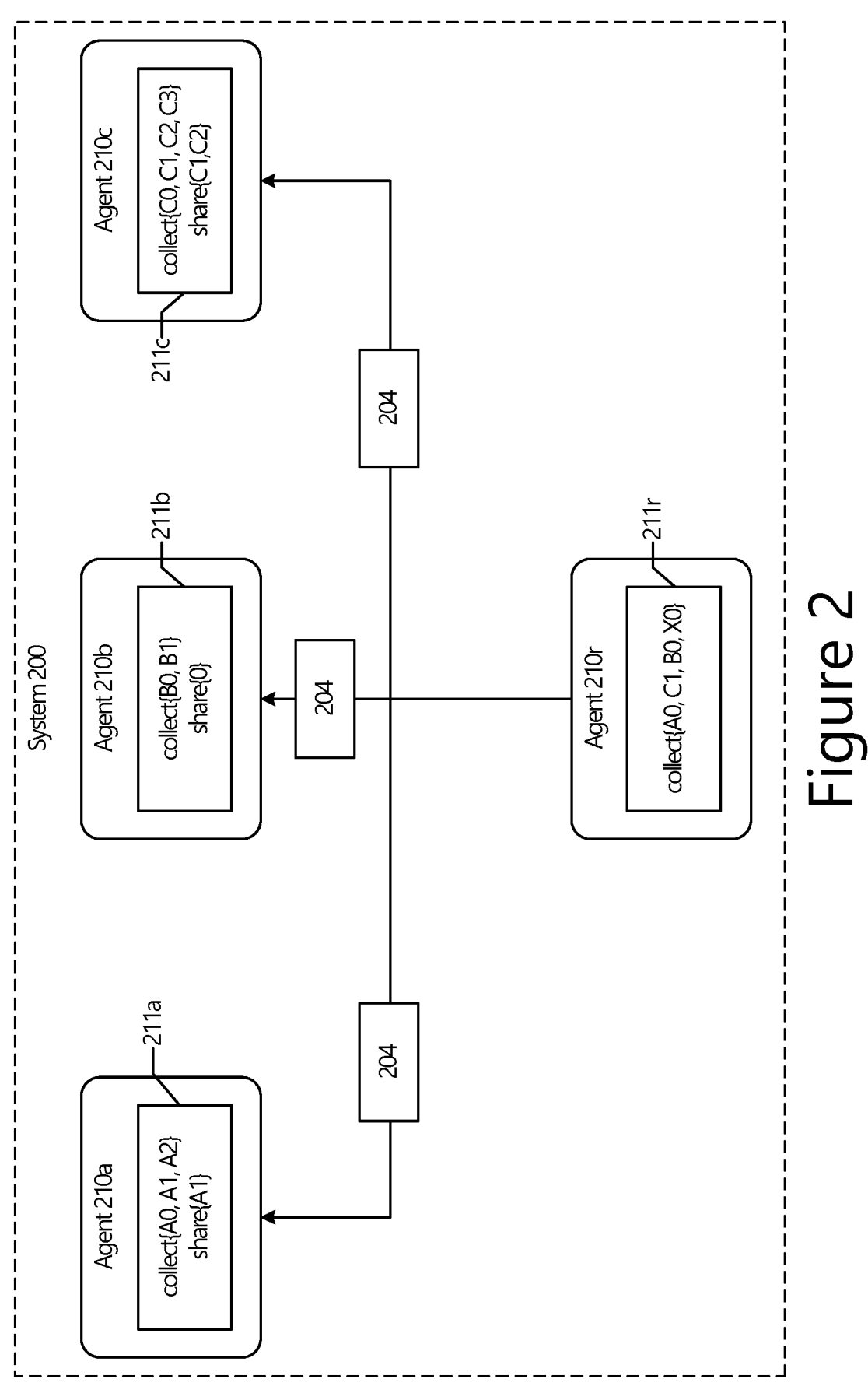
FIGS. 2, 3, 4, and 5 depict example operation of a telemetry redundant measurement avoidance protocol.

FIG. 2 shows a first example TRMAP operation wherein a requesting agent 210r sends a message 204 to other collection agents 210a, 210b, 210c. In some implementations, the message 204 indicates that the requesting agent 210r has opted-in to the TRMAP. Additionally or alternatively, the message 204 (also referred to as "request 204") indicates or includes a request for TMRA manifests 211 from the other collection agents 210. Additionally or alternatively, the message 204 (also referred to as "query 204") indicates or includes a query for shared telemetry data and/or relevant access information to access the shared telemetry data. Additionally or alternatively, the message 204 includes or indicates the desired metrics/measurements that the agent 210r wishes to collect (e.g., data A0, C1, B0, and X0 in the example of FIG. 2).

In any of the aforementioned implementations, the requesting agent 210r may generate and send the message 204 at startup or when the requesting agent 210r initializes. Additionally or alternatively, the requesting agent 210r may generate and send the message 204 on a periodic basis or at some predefined interval. Additionally or alternatively, the requesting agent 210r may generate and send the message 204 asynchronously (e.g., in response to some trigger, event, or detected condition(s) such as an update to the manifest 211r or a signal from an external source such as a user input device). In some implementations, the requesting agent 210r broadcasts or multicasts the message 204 to all known agents 210, and only opted-in agents 210 respond to the message 204. In other implementations, the requesting agent 210r only sends the message 204 to known opted-in agents 210.

Figure 3:
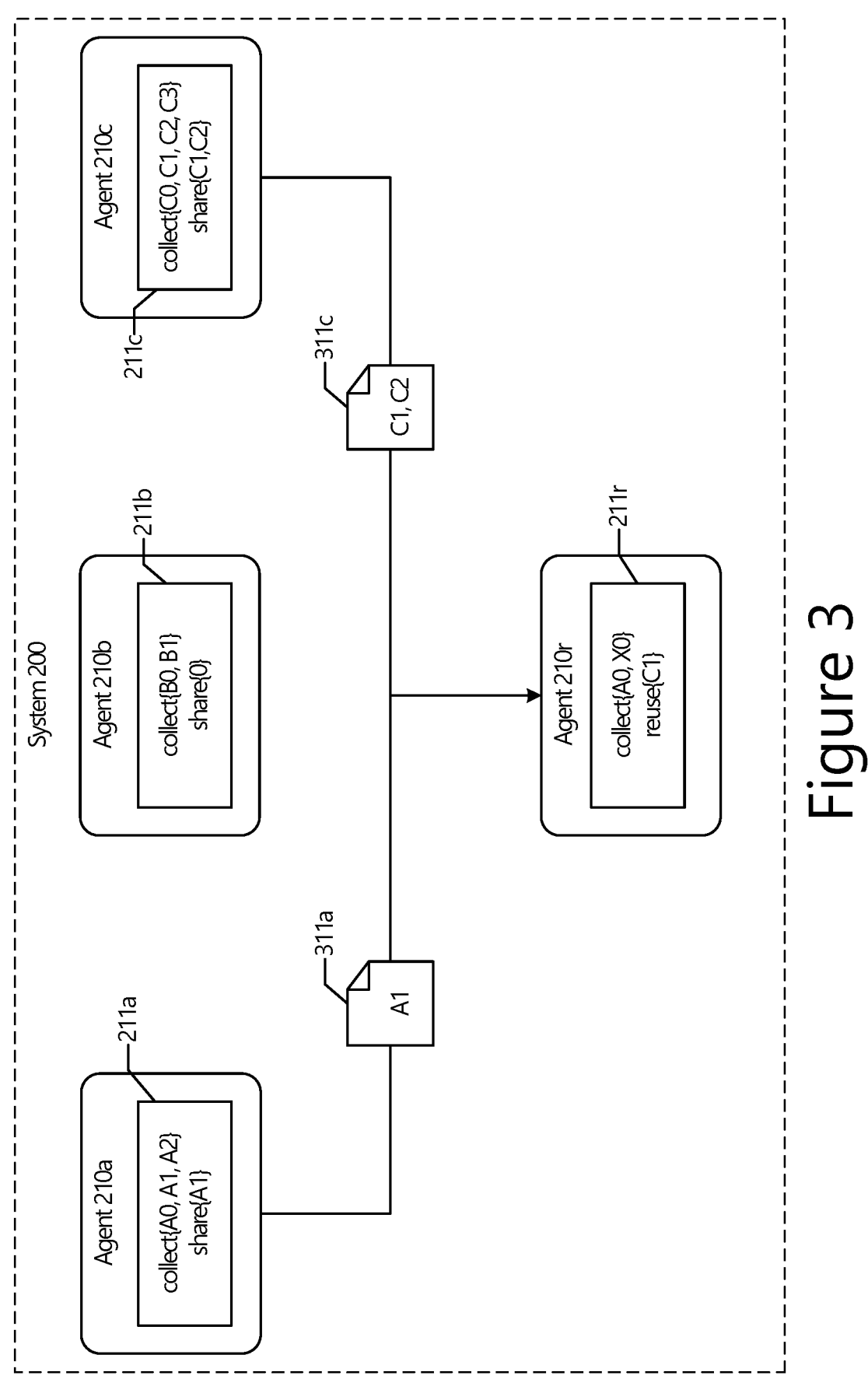

FIG. 3 shows a second example TRMAP operation wherein opted-in agents 210 (e.g., agent 210a and agent 210c in the example of FIG. 3) send respective collection configuration messages 311 (e.g., message 311a and message 311c in the example of FIG. 3) to the requesting agent 210r. In some implementations, the messages 311a, 311c include the entire manifests 211 of the participating agents 210. In other implementations, the messages 311a, 311c a subset of parameters from the manifests 211 of the participating agents 210. In other implementations, the messages 311 only indicate the data that the participating agents 210 are willing to share with the requesting agent 210r.

The configuration messages 311 and/or manifests 211 include relevant information that can be used to access and obtain the shared data/metrics, which can be used by the requesting agent 210r when needed. For example, a configuration message 311 may include an opt-in status of the sharing agent 210, the type of metrics/data that is being exposed by a sharing agent 210, and information needed to access the shared metrics/data (e.g., storage location(s), resources, and/or addresses of shared metrics/data; access credentials that can be used to access the shared metrics/data; and/or the like). Any other relevant data/information may be included in the configuration messages 311. In some implementations, the data that is shared or exposed by individual agents 210 may be based on the end-user license agreement (EULA) and/or operator/user opt-in statuses.

In the example of FIG. 3, that agent 210a is willing to share metrics A1, agent 210b is willing to share nothing, and agent 210c is willing to share metrics C1 and C2. Here, agent 210r analyzes the received messages 311 to determine which metrics it can obtain from the participating sharing agents 210. In this example, agent 210r decides to reuse metric C1 from agent 210c, determines to not collect or reuse metric B0 (e.g., relinquishes metric B0) as it could potentially crash the system 200 and/or cause some other error or failure, and determines to measure or collect metrics A0 and X0 on its own.

The manner in which an agent 210 analyzes and/or determines which data/metrics to obtain from participating agents 210, data/metrics to relinquish collecting, and/or data/metrics to collect may be implementation-specific and/or may vary depending use-case. In some cases, resources involved in measurement/metric collection may be unique, for example, where only one process or thread can use the resource at a time or are not marshalled by any entity. In these cases, the last agent 210 or other access entity to configure the resource overwrites existing values or parameters of that resource (sometimes without notifying other subsystems or entities in the system 200). These scenarios could lead to incorrect data/metrics being collected, and/or system instability, failures, and/or crashes. Many profilers and/or telemetry tools do not check for these conditions.

In some implementations, the requesting agent 210r compares the data in the received configuration messages 311 with its own manifest 211r and/or other collection policies or parameters. In some examples, the comparison can simply involve comparing the types of data included in the configuration messages 311 with the types of data in the manifest 211r. In other examples, the specific data collection attributes indicated by the configuration messages 311 can be analyzed. For example, if metric C1 includes processor utilization measurements, configuration message 311c indicates that metric C1 is collected at a sampling rate of 50 kilohertz (kHz) during a specified time period (e.g., a 24 hour period), and the manifest 211r specifies to collect metric C1 (processor utilization measurements) at a sampling rate of 25 kHz during a same or similar time period, then the requesting agent 210r may determine that sharing agent's 210c shared data/metrics C1 is suitable for the requesting agent's 210r telemetry system. In this example, the metric C1 for both agents 210c and 210r may be used to build a histogram or similar analysis. As another example, if metric C1 included in configuration message 311c is the same as in the previous example, but the manifest 211r specifies to collect metric C1 (processor utilization measurements) at a sampling rate of 50 kHz during the first two seconds when a process has been initialized, then the requesting agent 210r may determine that sharing agent's 210c shared data/metrics C1 are not suitable for the requesting agent's 210r telemetry system. In this example, the metric C1 for agent 210r may be used for a startup code behavior analysis, which may be incompatible with the metrics used for the histogram analysis in agent's 210c telemetry system. In some implementations, the requesting agent 210r determines to utilize shared data/metrics when the attributes of the to-be-reused data/metrics provides the same or better analytics as required by the requesting agent 210r (or the telemetry system to which the requesting agent 210r belongs). For example, the requesting agent 210r may determine to utilize or reuse shared data/metrics when the attributes of data collection parameters included in the manifest 211r overlap or are within some predetermined or configured range of data sharing parameters included in a sharing agent's 210 configuration message 311. Additionally or alternatively, the requesting agent 210r may relinquish utilizing or reusing a metric when the attributes of the data collection parameters included in the manifest 211r conflict with data sharing parameters included in an agent's 210 configuration message 311.

Additionally, in the example of FIG. 3, the requesting agent 210r determines to relinquish measuring, collecting, or reusing metric B0 so as not to interfere with the collection processes of agent 210b. This may be the case whether or not the requesting agent 210r knows the specific agent 210 collecting or otherwise accessing metric B (e.g., agent 210b in this example). The decision to relinquish or drop metric B0 may be based on various criteria such as, for example, the prevalence of metric B0 being collected by other collection agents deployed in other systems or networks, the probability that competing for access to metric B0 will cause a system crash or failure, among other criteria. This decision may be based on one or more policies configured in the manifest 211r, or signaled to the requesting agent 210r from an external source. In some implementations, the requesting agent 210r may determine to relinquish data collection for a particular metric if the requesting agent 210r does not receive any information about that metric from other agents 210 and/or by analyzing other data sources such as data access logs/records, and the like. Additionally or alternatively, the requesting agent 210r could attempt to access the data source producing metric B0 and/or determine if the resource related to metric B0 is in use. In these implementations, the requesting agent 210r can determine to relinquish accessing and/or reusing metric B0 after a predefined or configured number of access attempts (or when a predefined or configured number of failed accesses is reached) and/or if the resource related to metric B0 is in use (or busy) for a predefined or configured period of time.

In some cases, a sharing agent 210 copies and/or stores its collected data/metrics to a local and/or remote storage location, and the stored data/metrics are then uploaded to or otherwise sent through the collecting agent's 210 own dedicated telemetry pipeline. In various implementations, a collecting agent's 210 manifest 211 (or configuration message 311) may indicate the location of the shared data/metrics, and the requesting agent 210r copies the shared data/metrics from the indicated location, and uploads the shared data into the requesting agent's 210 own dedicated telemetry pipeline. For example, manifest 211c (or configuration message 311c) may indicate a storage location where data/metric C1 is to be located after it is collected by agent 210c, and the requesting agent 210r may use the information in the manifest 211c (or configuration message 311c) to access the storage location for metric C1 and send the metric C1 through its own telemetry pipeline.

Figure 4:
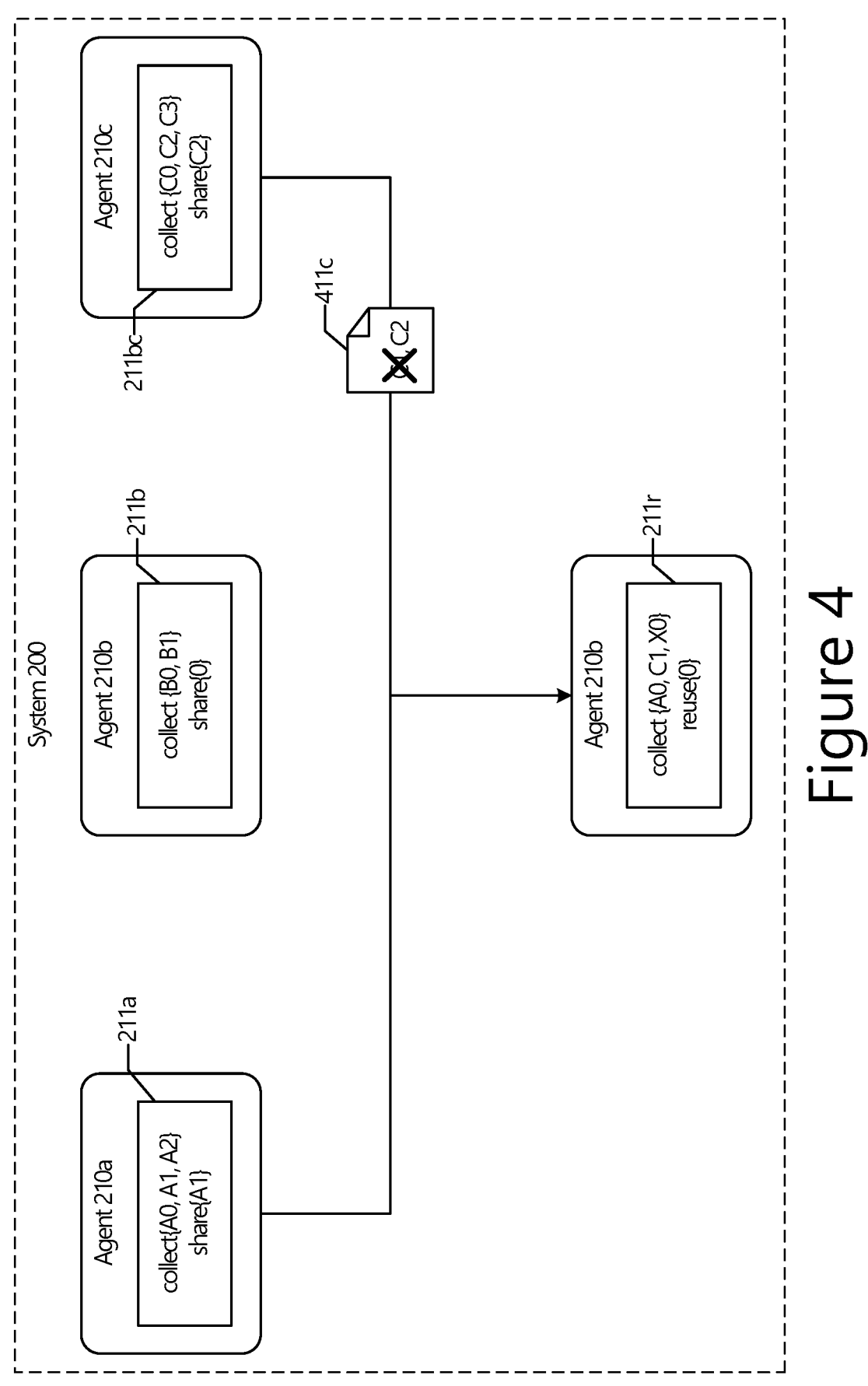

FIG. 4 shows a third example TRMAP operation where an agent 210 provides updated collection configurations 411 to requesting agents 210. The agent 210 that alters or updates its telemetry collection parameters is responsible for updating the involved agents by resending (e.g., broadcast, point-to-point transmission, or the like) its updated manifest 211 and/or updated collection configuration parameters. In the example of FIG. 4, agent 210c has its manifest 211c updated so that agent 210c stops collecting and/or sharing data/metric C1, and sends an updated configuration message 411c indicating that it will no longer share data/metric C1 to the requesting agent 210r. In some implementations, the agent 210c may generate and send the message 411c in response to its manifest 211c being updated and/or in response to some trigger or condition being detected. Additionally or alternatively, the agents 210 may send updated configuration messages 311/411 on a periodic basis or at some predefined or configured interval. In the example of FIG. 4, after analyzing the configuration message 411c, the requesting agent 210r adapts its own collection parameters according to the updated configuration message and reconfigures itself to begin collecting metric C1 on its own. The third example TRMAP operation is an event that can happen anytime during operation and/or while the TMRA protocol is in use.

There may be several reasons why a collection agent 210 stops collecting a certain type of data/metrics (or stops collecting data/metrics from a particular data source) such as, for example, end of runtime of the data source or the collection agent 210, a change in TRMAP opt-in status, attribute changes, changes to collected metric specifications, network and/or connection failures, measurement thresholds and/or envelopes being reached, and/or the like. For example, agent 210c may be configured with a maximum system resource envelope that allows agent 210c to collect metric C1 up to 1% of a processor's transactions with a shared memory resource (e.g., unbounded transactional memory (UTM) or large transactional memory (LTM) system), and agent 210c may update its collection configuration at or before the maximum system resource envelope has been reached. In another example, agent 210c may be configured to collect metric C1 based on system or application context, for example, when system 200 is operating a video game, then metric C1 may be a processor utilization of a GPU and when the video game processes are terminated, the metric C1 may switch to collecting CPU utilization thereby causing the attributes and/or parameters related to metric C1 to be updated in configuration message 411c.

Figure 5:
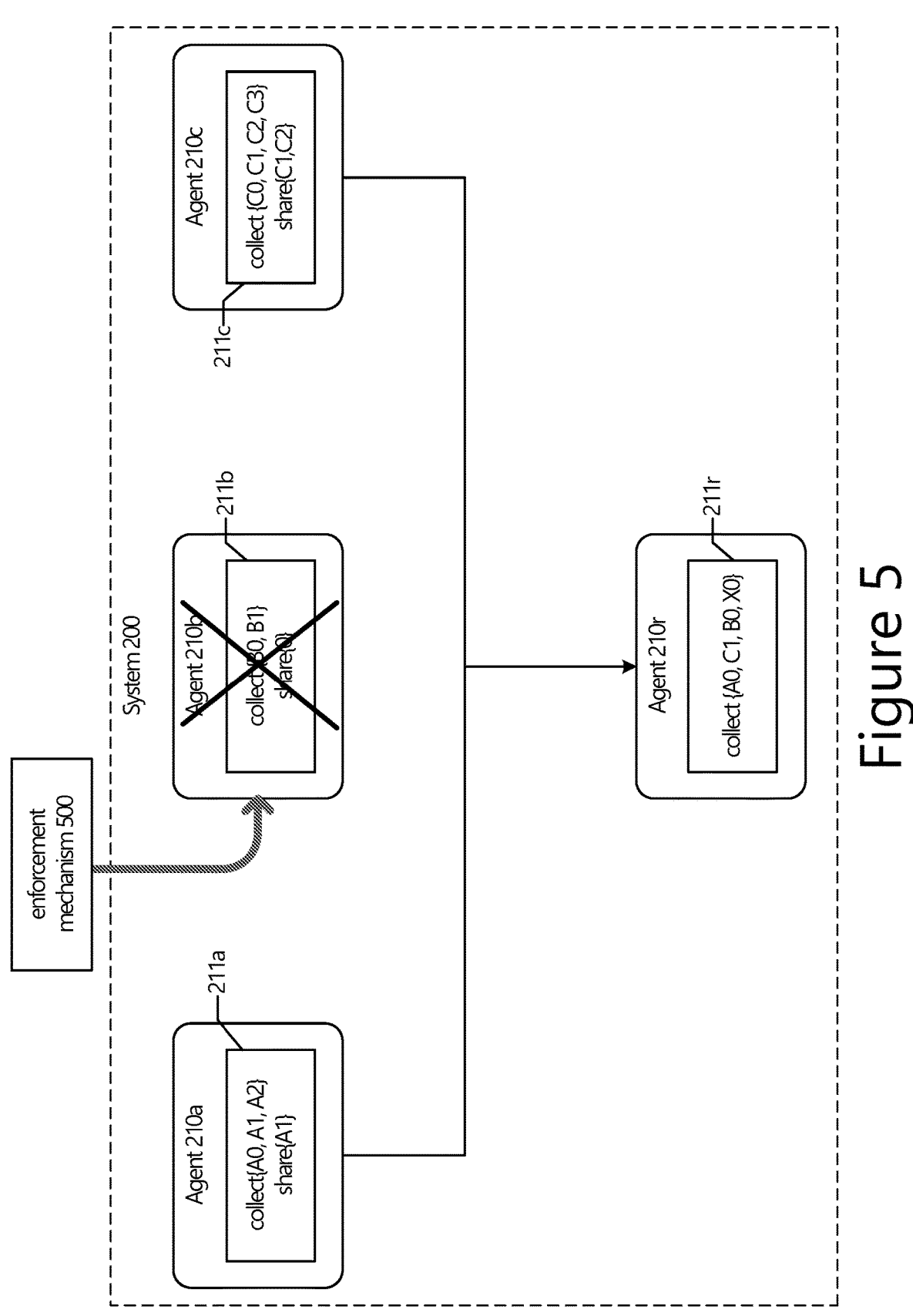

FIG. 5 shows a fourth example TRMAP operation where an enforcement mechanism 500 polices agent 210b that does not participate in the TRMAP on system 200. The enforcement mechanism 500 is employed to monitor the behavior of individual agents 210, and analyzes the behavior of the individual agents 210 to determine if they comply with the TRMAP. In some implementations, the enforcement mechanism 500 can trigger, via a suitable API/WS call, an expected behavior in individual agents 210 to analyze how they react to the trigger. Additionally or alternatively, the enforcement mechanism 500 can monitor message exchanges 204, 311, 411 between agents 210, intercept or otherwise obtain messages 204, 311, 411, and analyze the messages 204, 311, 411 for compliance with the TRMAP. Additionally or alternatively, the enforcement mechanism 500 can utilize SW/FW traces of the agents 210 to determine or identify compliance with the TRMAP.

The enforcement mechanism 500 can be scaled from disadvantaging the non-participant agent 210b to stopping or not allowing non-participant agent 210b to run on the system 200. As examples, the enforcement mechanism 500 can block non-participant agent 210b from interacting with participating agents 210a, 210c, 210r; refuse or otherwise prevent services from being consumed by agent 210b, or terminating execution of non-participant agent 210b. Additionally or alternatively, controls can be implemented to carry out finer grain enforcement. For example, the enforcement mechanism 500 can be configured to check or otherwise determine whether shared metrics are available and are accessible to participating agents 210a, 210c, 210r, check or otherwise determine whether the TRMAP is being properly followed by participating agents 210a, 210c, 210r, and/or warn developers/manufacturers about delinquent agent 210 behaviors; and/or the like.

In this example, the enforcement mechanism 500 is not technically part of the TRMAP, and therefore, the enforcement mechanism 500 is not implemented by one or more of the collection agents 210. As examples, the enforcement mechanism 500 can be an orchestrator (such as any of those discussed in [MEC], [ETSINFV], [O-RAN], [SA6Edge], [SEO], [OSM], [ZSM], and/or the like) security SW, local controller, and/or other like entity implemented as a SW and/or FW element.

2. Example Computing Systems, Configurations, and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and/or the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), VMs, Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, and/or the like). The orchestration functions may be used to deploy the isolated user-space instances, identifying and scheduling use of specific HW, security related functions (e.g., key management, trust anchor management, and/or the like), and other tasks related to the provisioning and life-cycle of isolated user spaces.

Applications that have been adapted for edge computing include but are not limited to virtualization of traditional network functions including include, for example, SDN, NFV, distributed RAN units and/or RAN clouds, and the like. Additional example use cases for edge computing include computational offloading, CDN services (e.g., video on demand, content streaming, security surveillance, alarm system monitoring, building access, data/content caching, and/or the like), gaming services (e.g., AR/VR, and/or the like), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [SEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 6:
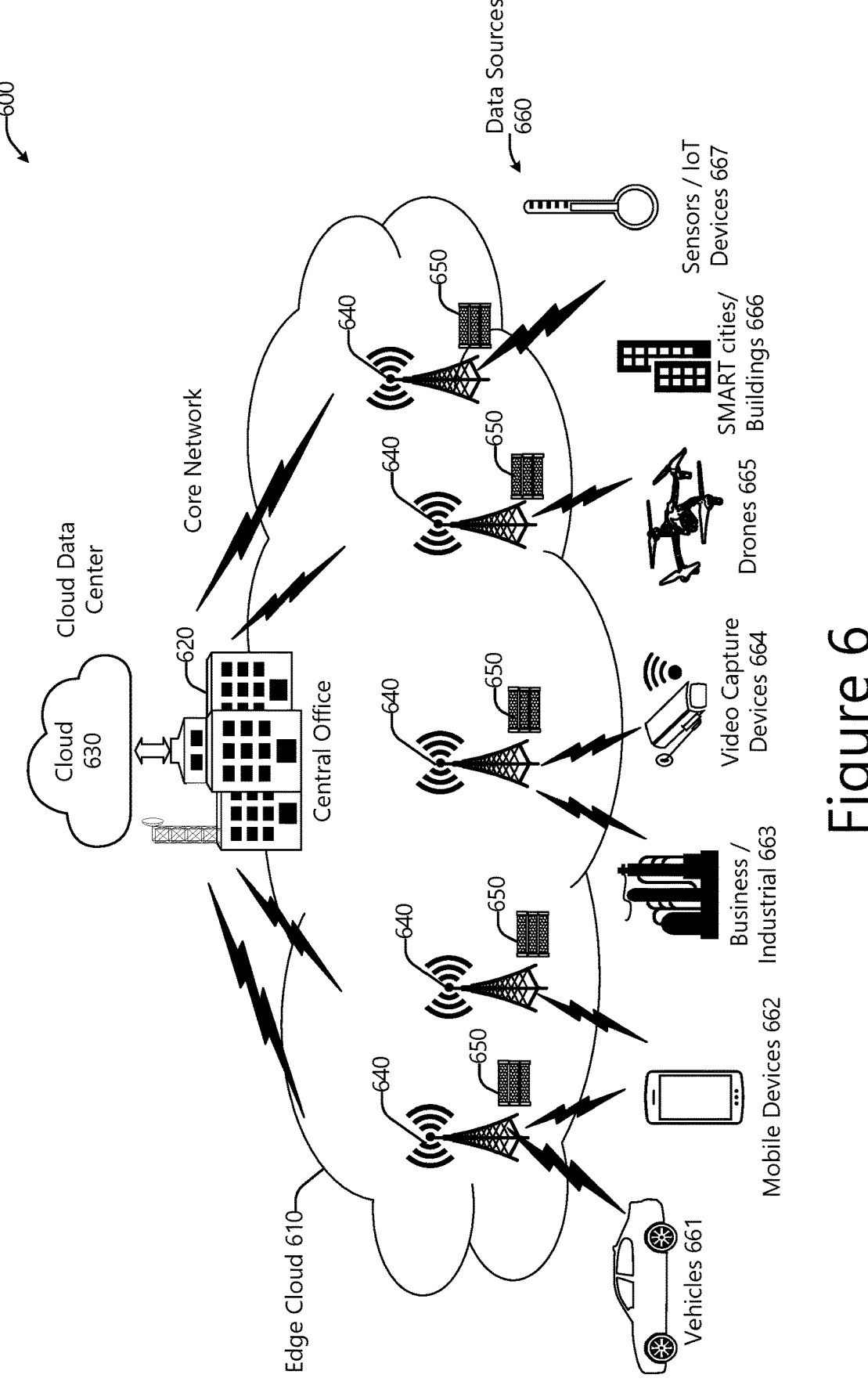
FIG. 6 illustrates an overview of an edge cloud configuration for edge computing.

FIG. 6 shows an example edge computing system 600, which includes a layer of processing referred to in many of the following examples as an edge cloud 610. The edge cloud 610 is co-located at an edge location, such as a network access node (NAN) 640 (e.g., an access point, base station, and/or the like), a local processing hub 650, a central office 620, and/or may include multiple entities, devices, and equipment instances. The edge cloud 610 is located closer to the endpoint (e.g., consumer and producer) data sources 660 than the cloud data center 630. The data sources 660 include, for example, autonomous vehicles 661, user equipment 662, business and industrial equipment 663, video capture devices 664, drones 665, smart cities and building devices 666, sensors and IoT devices 667, and/or the like. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits. In various implementations, one or more cloud compute nodes in the cloud data center 630 can be, or include, one or more telemetry elements or systems that implement the TRMAP aspects discussed herein.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

Aspects of an edge cloud architecture covers multiple potential deployments and addresses restrictions that some network operators or service providers may have in their own infrastructures. These include variations of configurations based on edge location (e.g., because edges at a base station level may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute HW architecture) implemented at NANs 640 (e.g., base stations, gateways, network routers, access points, and the like) and/or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. In another example, NANs 640 may be augmented with compute and acceleration resources to directly process service workloads for connected user equipment, without further communicating data via backhaul networks. In another example, network management HW of the central office 620 may be replaced or supplemented with standardized compute HW that performs virtualized network functions and offers compute resources for the execution of services and consumer functions for connected devices. Additionally or alternatively, an arrangement with HW combined with virtualized functions, commonly referred to as a hybrid arrangement, can be successfully implemented. Within edge computing networks, there may be scenarios in services which the compute resource will be "moved" to the data, as well as scenarios in which the data will be "moved" to the compute resource. For example, NAN 640 compute, acceleration, and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In some examples, resources are accessed under usage pressure from incoming streams due to multiple services utilizing the edge cloud 610. To achieve results with low latency, the services executed within the edge cloud 610 balance varying requirements in terms of, for example, priority (e.g., throughput or latency); Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); reliability and resiliency (e.g., some input streams need to be acted upon and the traffic routed with mission-critical reliability, where as some other input streams may be tolerate an occasional failure, depending on the application); and/or physical constraints (e.g., power, cooling, form-factor, environmental conditions, and/or the like).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to understand the impact of the SLA violation, and augment other components in the system to resume overall transaction SLA, and implement steps to remediate.

Thus, with these variations and service features in mind, edge computing within the edge cloud 610 may provide the ability to serve and respond to multiple applications of the use cases (e.g., object tracking, video surveillance, connected cars, and/or the like) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, and the like), which cannot leverage conventional cloud computing due to latency or other limitations. With the advantages of edge computing comes the following caveats. The devices located at the edge are often resource constrained and therefore there is pressure on usage of edge resources. Typically, this is addressed through the pooling of memory and storage resources for use by multiple users (e.g., tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of HW and root of trust trusted functions are also required, because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at various layers operating in the edge cloud, which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider (e.g., "telco" or "TSP"), IoT service provider, cloud service provider (CSP), enterprise entity, or any other number of entities. Various implementations and configurations of the edge computing system may be provided dynamically, such as when orchestrated to meet service objectives.

In some examples, a client compute node (e.g., data source devices 660) is embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected HW and/or SW configurations to facilitate or use the edge cloud 610. As such, the edge cloud 610 is formed from network components and functional features operated by and within edge gateway nodes, edge aggregation nodes, or other edge compute nodes among various network layers. The edge cloud 610 thus may be embodied as any type of network that provides edge computing and/or storage resources which are proximately located to radio access network (RAN) capable endpoint devices (e.g., mobile computing devices, IoT devices, smart devices, and/or the like), which are discussed herein. In other words, the edge cloud 610 may be envisioned as an "edge" which connects the endpoint devices and traditional network NANs that serve as an ingress point into service provider core networks, including WLAN networks (e.g., WiFi access points), mobile carrier networks (e.g., Global System for Mobile Communications (GSM) networks, Long-Term Evolution (LTE) networks, 5G/6G networks, and/or the like), while also providing storage and/or compute capabilities. Other types and forms of network access (e.g., WLAN, long-range wireless, wired networks including optical networks) may also be utilized in place of or in combination with such 3GPP carrier networks.

The data sources 660 (also referred to as "user equipment 660" or "UEs 660") may utilize respective connections (or channels), each of which comprises a physical communications interface or layer, to exchange data with one another and/or with other elements depicted in FIG. 6. The UEs 660 may utilize any suitable wireless or wired protocol (such as any of those discussed herein) for this purpose.

Additionally or alternatively, individual UEs 660 provide radio information to one or more NANs 640 and/or one or more edge compute nodes (e.g., edge servers/hosts, and the like). The radio information may be in the form of one or more measurement reports, and/or may include, for example, signal strength measurements, signal quality measurements, and/or the like. Each measurement report is tagged with a timestamp and the location of the measurement (e.g., the UE's current location and the like). As examples, the measurements collected by the UEs 660 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v16.2.0 (Mar. 31, 2021) ("[TS36214]"), 3GPP TS 38.215 v16.4.0 (Jan. 8, 2021) ("[TS38215]"), 3GPP TS 38.314 v16.4.0 (Sep. 30, 2021) ("[TS38314]"), *IEEE Standard for Information Technology—Telecommunications and Information Exchange between Systems—Local and Metropolitan Area Networks—Specific Requirements—Part* 11: *Wireless LAN Medium Access Control* (*MAC*) *and Physical Layer* (*PHY*) *Specifications, IEEE Std* 802.11-2020, pp. 1-4379 (26 Feb. 2021) ("[IEEE80211]"), and/or the like. Additionally or alternatively, any of the aforementioned measurements (or combination of measurements) may be collected by one or more NANs and provided to the edge compute node(s).

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, and the like); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, and the like); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, and the like); measurements related to Registration Management (RM); measurements related to Session Management (SM) (e.g., number of PDU sessions requested to setup; number of PDU sessions successfully setup; number of PDU sessions failed to setup, and the like); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, and the like); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, and the like); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.7.1 (Jun. 17, 2022) ("[TS28552]"), 3GPP TS 32.425 v17.1.0 (Jun. 24, 2021) ("[TS32425]"), and/or the like.

The radio information may be reported in response to a trigger event and/or on a periodic basis. Additionally or alternatively, individual UEs report radio information either at a low periodicity or a high periodicity depending on a data transfer that is to take place, and/or other information about the data transfer. Additionally or alternatively, the edge compute node(s) may request the measurements from the NANs at low or high periodicity, or the NANs may provide the measurements to the edge compute node(s) at low or high periodicity. Additionally or alternatively, the edge compute node(s) may obtain other relevant data from other edge compute node(s), core network functions (NFs), application functions (AFs), and/or other UEs such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, and the like) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the examples discussed herein, any suitable data collection and/or measurement mechanism(s) may be used to collect the observation data. For example, data marking (e.g., sequence numbering, and the like), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various SW parameters (e.g., OS type and version, and the like). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [SEO]), IETF (e.g., [MAMS]), IEEE/WiFi (e.g., [IEEE80211], [WiMAX], [IEEE16090], and the like), and/or any other like standards such as those discussed herein.

The components of the edge cloud 610 can include one or more compute nodes referred to as "edge compute nodes", which can include servers, multi-tenant servers, appliance computing devices, and/or any other type of computing devices such as any of those discussed herein. For example, the edge cloud 610 may include an edge compute node that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting HW to enable attachment to structures such as buildings, telecommunication structures (e.g., poles, antenna structures, and/or the like) and/or racks (e.g., server racks, blade mounts, and/or the like). Example housings and/or surfaces thereof may support one or more sensors (e.g., temperature sensors, vibration sensors, light sensors, acoustic sensors, capacitive sensors, proximity sensors, and/or the like). One or more such sensors may be contained in, carried by, or otherwise embedded in the surface and/or mounted to the surface of the appliance. Example housings and/or surfaces thereof may support mechanical connectivity, such as propulsion HW (e.g., wheels, propellers, and/or the like) and/or articulating HW (e.g., robot arms, pivotable appendages, and/or the like). In some circumstances, the sensors may include any type of input devices such as user interface HW (e.g., buttons, switches, dials, sliders, and/or the like). In some circumstances, example housings include output devices contained in, carried by, embedded therein and/or attached thereto. Output devices may include displays, touchscreens, lights, LEDs, speakers, I/O ports (e.g., USB), and/or the like. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices can include IoT devices. The edge compute node may include HW and SW components to manage local issues such as device temperature, vibration, resource utilization, updates, power issues, physical and network security, and/or the like. Additionally or alternatively, the edge compute node can be one or more servers that include an operating system and implement a virtual computing environment. A virtual computing environment includes, for example, a hypervisor managing (e.g., spawning, deploying, destroying, and/or the like) one or more virtual machines, one or more virtualization containers, and/or the like. Such virtual computing environments provide an execution environment in which one or more applications and/or other SW, code or scripts may execute while being isolated from one or more other applications, SW, code or scripts. Additionally or alternatively, the edge compute node can be, or include, a telemetry system and/or telemetry agents that implement the various TRMAP techniques discussed herein. Example HW for implementing edge compute nodes is described in conjunction with FIG. 8.

The edge compute nodes may be deployed in a multitude of arrangements. In some examples, the edge compute nodes of the edge cloud 610 are co-located with one or more NANs 640 and/or one or more local processing hubs 650. Additionally or alternatively, the edge compute nodes are operated on or by the local processing hubs 650. Additionally or alternatively, multiple NANs 640 can be co-located or otherwise communicatively coupled with an individual edge compute node. Additionally or alternatively, an edge compute node can be co-located or operated by a radio network controller (RNC) and/or by NG-RAN functions. Additionally or alternatively, an edge compute node can be deployed at cell aggregation sites or at multi-RAT aggregation points that can be located either within an enterprise or used in public coverage areas. In a fourth example, an edge compute node can be deployed at the edge of a core network. Other deployment options are possible in other implementations In any of the implementations discussed herein, the edge compute nodes provide a distributed computing environment for application and service hosting, and also provide storage and processing resources so that data and/or content can be processed in close proximity to subscribers (e.g., users and/or data sources 660) for faster response times. The edge compute nodes also support multitenancy run-time and hosting environment(s) for applications, including virtual appliance applications that may be delivered as packaged VM images, middleware application and infrastructure services, content delivery services including content caching, mobile big data analytics, and computational offloading, among others. Computational offloading involves offloading computational tasks, workloads, applications, and/or services to the edge compute nodes from the edge compute nodes, the core network, cloud 630, and/or application server(s), or vice versa. For example, a device application or client application operating in a data source 660 may offload application tasks or workloads to one or more edge compute nodes. In another example, an edge compute node may offload application tasks or workloads to one or more data source devices 660 (e.g., for distributed Ai/ML computation and/or the like).

The edge compute nodes may include or be part of an edge system (e.g., edge cloud 610) that employs one or more edge computing technologies (ECTs). The edge compute nodes may also be referred to as "edge hosts", "edge servers", and/or the like The edge system (edge cloud 610) can include a collection of edge compute nodes and edge management systems (not shown) necessary to run edge computing applications within an operator network or a subset of an operator network. The edge compute nodes are physical computer systems that may include an edge platform and/or virtualization infrastructure, and provide compute, storage, and network resources to edge computing applications. Each of the edge compute nodes are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to data source devices 660. The VI of the edge compute nodes provide virtualized environments and virtualized resources for the edge hosts, and the edge computing applications may run as VMs and/or application containers on top of the VI.

In one example implementation, the ECT operates according to the MEC framework, as discussed in ETSI GS MEC 003 V3.1.1 (2022-03), ETSI GS MEC 009 V3.1.1 (2021-06), ETSI GS MEC 010-1 v1.1.1 (2017-10), ETSI GS MEC 010-2 v2.2.1 (2022-02), ETSI GS MEC 011 v2.2.1 (2020-12), ETSI GS MEC 012 V2.2.1 (2022-02), ETSI GS MEC 013 v2.2.1 (2022-01), ETSI GS MEC 014 V1.1.1 (2021-02), ETSI GS MEC 015 v2.1.1 (2020-06), ETSI GS MEC 016 v2.2.1 (2020-04), ETSI GS MEC 021 v2.2.1 (2022-02), ETSI GS MEC 028 v2.2.1 (2021-07), ETSI GS MEC 029 v2.2.1 (2022-01), ETSI MEC GS 030 v2.2.1 (2022-05), ETSI GS NFV-MAN 001 v1.1.1 (2014-12), U.S. Provisional App. No. 63/003,834 filed Apr. 1, 2020 ("['834]"), and Int'l App. No. PCT/US2020/066969 filed on Dec. 23, 2020 ("['969]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021-03), ETSI GS NFV 002 V1.2.1

(2014-12), ETSI GR NFV 003 V1.6.1 (2021-03), ETSI GS NFV 006 V2.1.1 (2021-01), ETSI GS NFV-INF 001 V1.1.1 (2015-01), ETSI GS NFV-INF 003 V1.1.1 (2014-12), ETSI GS NFV-INF 004 V1.1.1 (2015-01), ETSI GS NFV-MAN 001 v1.1.1 (2014-12), and/or Open Source MANO documentation, version 12 (June 2022), https://osm.etsi.org/docs/user-guide/v12/ index.html ("[OSM]") (collectively referred to as "[ETSINFV]"), the contents of each of which are hereby incorporated by reference in their entireties. Other virtualization technologies and/or service orchestration and automation platforms may be used such as, for example, those discussed in E2E Network Slicing Architecture, GSMA, Official Doc. NG.127, v1.0 (3 Jun. 2021), https://www.gsma.com/newsroom/wp-content/uploads//NG.127-v1.0-2. pdf, Open Network Automation Platform (ONAP) documentation, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.2.0 (Mar. 22, 2022) ("[TS28533]"), the contents of each of which are hereby incorporated by reference in their entireties; and/or a management function based on Zero-touch System Management (ZSM) architecture (see e.g., ETSI GS ZSM 001 V1.1.1 (2019-10), ETSI GS ZSM 002 v1.1.1 (2019-08), ETSI GS ZSM 003 v1.1.1 (2021-06) ETSI GS ZSM 009-1 V1.1.1 (2021-06), ETSI GS ZSM 009-2 V1.1.1 (2022-06), ETSI GS ZSM 007 V1.1.1 (2019-08) (collectively referred to as "[ZSM]"), the contents of each of which are hereby incorporated by reference in their entireties.

In another example implementation, the ECT operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and inter-operability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable HW with radio access control powered by AI. Various aspects of the O-RAN architecture are described in *O-RAN Architecture Description* v06.00, O-RAN ALLIANCE WG1 (March 2022); *O-RAN Operations and Maintenance Architecture Specification* v04.00, O-RAN ALLIANCE WG1 (February 2021); *O-RAN Operations and Maintenance Interface Specification* v04.00, O-RAN ALLIANCE WG1 (February 2021); *O-RAN Information Model and Data Models Specification* v01.00, O-RAN ALLIANCE WG1 (February 2021); *O-RAN Working Group 1 Slicing Architecture* v06.00, O-RAN ALLIANCE WG1 (March 2022); *O-RAN Working Group 2 (Non-RT RIC and A1 interface WG) A1 interface: Application Protocol* v03.01, O-RAN ALLIANCE WG2 (June 2021); *O-RAN Working Group 2 (Non RT RIC and A1 interface WG) A1 interface: Type Definitions* v02.03, O-RAN ALLIANCE WG2 (October 2021); *O-RAN Working Group 2 (Non-RT RIC and A1 interface WG) A1 interface: Transport Protocol* v01.01, O-RAN ALLIANCE WG2 (June 2021); *O-RAN Working Group 2 AI/ML workflow description and requirements* v01.03 O-RAN ALLIANCE WG2 (October 2021); *O-RAN Working Group 2 Non-RT RIC Architecture* v01.00 O-RAN ALLIANCE WG2 (October 2021); *O-RAN Working Group 2 Non-RT RIC: Functional Architecture* v01.01, O-RAN ALLIANCE WG2 (July 2021); *O-RAN Working Group 2 (Non-RT RIC and A1 interface WG): R1 interface: General Aspects and Principles* v01.00, O-RAN ALLIANCE WG2 (March 2022); *O-RAN Working Group 3 Near-Real-time Intelligent Controller Architecture & E2 General Aspects and Principles* v02.01, O-RAN ALLIANCE WG3 (March 2022); *O-RAN Working Group 3 Near-Real-time Intelligent Controller E2 Service Model (E2SM)* v02.01, O-RAN ALLIANCE WG3 (March 2022); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) KPM* v02.01, *O-RAN ALLIANCE WG3 (March* 2022); *O-RAN Working Group 3 Near-Real-time Intelligent Controller E2 Service Model (E2SM) RAN Control* v01.01, O-RAN ALLIANCE WG3 (March 2022); *O-RAN Working Group 3, Near-Real-time Intelligent Controller, E2 Application Protocol (E2AP)* v02.01, O-RAN ALLIANCE WG3 (March 2022); *O-RAN Working Group 3 Near-Real-time Intelligent Controller Near RT RIC Architecture* v02.01, O-RAN ALLIANCE WG3 (March 2022); *O-RAN Working Group 4 (Open Fronthaul Interfaces WG) Control, User and Synchronization Plane Specification* v08.01, O-RAN ALLIANCE WG4 (May 2022); and *O-RAN Working Group 4 (Open Fronthaul Interfaces WG) Control, User and Synchronization Plane Specification*, v07.02, O-RAN ALLIANCE WG4 (May 2022); *O-RAN Fronthaul Working Group 4 Cooperative Transport Interface Transport Control Plane Specification* v02.00, O-RAN ALLIANCE WG4 (June 2021); *O-RAN Fronthaul Working Group 4 Cooperative Transport Interface Transport Management Plane Specification* v02.00, O-RAN ALLIANCE WG4 (June 2021); *O-RAN Fronthaul Working Group 4 Management Plane Specification* v08.00, O-RAN ALLIANCE WG4 (March 2022) ("[O-RAN.WG4. MP.0-v08.00]"); *O-RAN Fronthaul Working Group 4 Management Plane Specification* v07.01, O-RAN ALLIANCE WG4 (April 2022); *O-RAN Alliance Working Group 5 O1 Interface specification for O-DU* v03.00, O-RAN ALLIANCE WG5 (March 2022); *O-RAN Open F1/W1/E1/X2/Xn Interfaces Working Group Transport Specification* v01.00, O-RAN ALLIANCE WG5 (April 2020); *Cloud Architecture and Deployment Scenarios for O-RAN Virtualized RAN* v02.02, O-RAN ALLIANCE WG6 (October 2021); *Cloud Platform Reference Designs* v02.00, O-RAN ALLIANCE WG6 (February 2021); *O-RAN O2 Interface General Aspects and Principles* v01.02, O-RAN ALLIANCE WG6 (March 2022); *O-RAN Acceleration Abstraction Layer General Aspects and Principles* v02.00, O-RAN ALLIANCE WG6 (March 2022); *O-RAN White Box Hardware Working Group Hardware Reference Design Specification for Indoor Pico Cell with Fronthaul Split Option 6* v02.00, O-RAN ALLIANCE WG7 (October 2021); *O-RAN WG7 Hardware Reference Design Specification for Indoor Picocell (FR1) with Split Option 7-2* v03.00, O-RAN ALLIANCE WG7 (October 2021); *O-RAN White Box Hardware Working Group Hardware Reference Design Specification for Outdoor Micro Cell with Split Architecture Option 7.2* v02.00, O-RAN ALLIANCE WG7 (October 2021); *O-RAN WG7 Hardware Reference Design Specification for Indoor Picocell (FR1) with Split Option 8* v03.00, O-RAN ALLIANCE WG7 (October 2021); *O-RAN Open X-haul Transport Working Group Management interfaces for Transport Network Elements* v03.00, O-RAN ALLIANCE WG9 (March 2022); *O-RAN Open X-haul Transport Working Group Synchronization Architecture and Solution Specification*, O-RAN ALLIANCE WG9 (March 2022); *O-RAN Open Xhaul Transport WG9 WDM-based Fronthaul Transport*, O-RAN ALLIANCE WG9 (March 2022); *O-RAN Open Transport Working Group 9 Xhaul Packet Switched Architectures and Solutions* v02.00, O-RAN ALLIANCE WG9 (October 2021) ("[ORAN-WG9. XPAAS]"); *O-RAN Operations and Maintenance Architecture* v06.00, O-RAN ALLIANCE WG10 (March 2022); *O-RAN Operations and Maintenance Interface Specification* v06.00, O-RAN ALLIANCE WG10 (March 2022); *O-RAN: Towards an Open and Smart RAN*, O-RAN ALLIANCE, White Paper (October 2018); and U.S. application Ser. No. 17/484,743 filed on 24 Sep. 2021 (collectively referred to as "[O-RAN]") the contents of each of which are hereby incorporated by reference in their entireties.

In another example implementation, the ECT operates according to the $3^{rd}$ Generation Partnership Project (3GPP) System Aspects Working Group 6 (SA6) Architecture for enabling Edge Applications (referred to as "3GPP edge computing") as discussed in 3GPP TS 23.558 v17.1.0 (Sep. 24, 2021) ("[TS23558]"), 3GPP TS 23.501 v17.3.0 (Dec. 23, 2021) ("[TS23501]"), and U.S. application Ser. No. 17/484, 719 filed on 24 Sep. 2021 ("['719]") (collectively referred to as "[SA6Edge]"), the contents of each of which is hereby incorporated by reference in their entireties.

In another example implementation, the ECT operates according to the Intel® Smart Edge Open framework (formerly known as OpenNESS) as discussed in Intel® Smart Edge Open Developer Guide, version 22.05 (29 Jun. 2022), https://smart-edge-open.github.io/, and/or Intel® Smart Edge Open Telemetry Documentation, https://smart-edge-open.github.io/docs/components/telemetry/telemetry/ (collectively "[SEO]"), the contents of which are hereby incorporated by reference in its entirety.

In another example implementation, the ECT operates according to the Multi-Access Management Services (MAMS) framework as discussed in Kanugovi et al., *Multi-Access Management Services (MAMS)*, INTERNET ENGINEERING TASK FORCE (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTO-COL-09, IETA, INTAREA (4 Mar. 2020), and Zhu et al., *Generic Multi-Access (GMA) Convergence Encapsulation Protocols*, IETF DRAFT-ZHU-INTAREA-GMA-14, IETA, INTAREA/Network Working Group (24 November 2021) (collectively referred to as "[MAMS]"), the contents of each of which are hereby incorporated by reference in their entireties. In these implementations, an edge compute node and/or one or more cloud computing nodes/clusters may be one or more MAMS servers that includes or operates a Network Connection Manager (NCM) for downstream/DL traffic, and the client include or operate a Client Connection Manager (CCM) for upstream/UL traffic. An NCM is a functional entity that handles MAMS control messages from clients (e.g., a client that configures the distribution of data packets over available access paths and (core) network paths, and manages user-plane treatment (e.g., tunneling, encryption, and/or the like) of the traffic flows (see e.g., [MAMS]). The CCM is the peer functional element in a client (e.g., a client that handles MAMS control-plane procedures, exchanges MAMS signaling messages with the NCM, and configures the network paths at the client for the transport of user data (e.g., network packets, and/or the like) (see e.g., [MAMS]).

It should be understood that the aforementioned edge computing frameworks and services deployment examples are only one illustrative example of edge computing systems/networks, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

FIG. 7 illustrates an example SW distribution platform 705 to distribute SW 760 to one or more devices, such as example processor platform(s) 700. The example SW distribution platform 705 may be implemented by any computer server, data facility, cloud service, and/or the like, capable of storing and transmitting SW to other computing devices (e.g., third parties, the connected devices 862 of FIG. 8, and/or any other device such as any of those discussed herein). In some examples, SW 760 corresponds to the example computer readable instructions 860, 881, 882, and/or 883 of FIG. 8. In some examples, the processor platform(s) 700 correspond to the TPS 100 as a whole or one or more of collection agent 110, monitoring function 120, analytics function 130, decision function 140, execution function 150, and/or controlled entity 160 of FIG. 1; system 200 or an individual collection agent 210 of FIGS. 2-5; the local processing hub 650, NAN 640, data source devices 660, edge compute nodes and/or edge cloud 610 of FIG. 6; compute node 850 and/or connected devices 862 of FIG. 8; and/or any of the other computing systems/devices discussed herein.

In the example of FIG. 7, the SW distribution platform 705 includes one or more servers and one or more storage devices. The storage devices store the computer readable instructions 760, which may correspond to the example computer readable instructions 860 of FIG. 8, as described above. The one or more servers of the example SW distribution platform 705 are in communication with a network 710, which may correspond to any one or more of the Internet and/or any of the example networks as described herein. In some examples, the one or more servers are responsive to requests to transmit the SW to a requesting party as part of a commercial transaction. Payment for the delivery, sale and/or license of the SW may be handled by the one or more servers of the SW distribution platform and/or via a third-party payment entity. The servers enable purchasers and/or licensors to download the computer readable instructions 760 from the SW distribution platform 705. For example, the SW 760, which may correspond to the example computer readable instructions 860 of FIG. 8, may be downloaded to the example processor platform(s) 700, which is/are to execute the computer readable instructions 760 to implement the various implementations discussed herein. In some examples, one or more servers of the SW distribution platform 705 are communicatively connected to one or more security domains and/or security devices through which requests and transmissions of the example computer readable instructions 760 must pass. In some examples, one or more servers of the SW distribution platform 705 periodically offer, transmit, and/or force updates to the SW (e.g., the example computer readable instructions 860 of FIG. 8) to ensure improvements, patches, updates, and/or the like are distributed and applied to the SW at the end user devices.

The computer readable instructions 760 are stored on storage devices of the SW distribution platform 705 in a particular format. A format of computer readable instructions includes, but is not limited to a particular code language (e.g., Java, JavaScript, Python, C, C#, SQL, HTML, and/or the like), and/or a particular code state (e.g., uncompiled code (e.g., ASCII), interpreted code, linked code, executable code (e.g., a binary), and/or the like). In some examples, the computer readable instructions 881, 882, 883 stored in the SW distribution platform 705 are in a first format when transmitted to the example processor platform(s) 700. In some examples, the first format is an executable binary in which particular types of the processor platform(s) 700 can execute. However, in some examples, the first format is uncompiled code that requires one or more preparation tasks to transform the first format to a second format to enable execution on the example processor platform(s) 700. For instance, the receiving processor platform(s) 700 may need to compile the computer readable instructions 760 in the first format to generate executable code in a second format that is capable of being executed on the processor platform(s) 700. In still other examples, the first format is interpreted code that, upon reaching the processor platform(s) 700, is interpreted by an interpreter to facilitate execution of instructions.

FIG. 8 illustrates an example of components that may be present in an compute node 850 for implementing the techniques (e.g., operations, processes, methods, and methodologies) described herein. This compute node 850 provides a closer view of the respective components of node 850 when implemented as or as part of a computing device (e.g., as a mobile device, a base station, server, gateway, and/or the like). The compute node 850 may include any combinations of the HW or logical components referenced herein, and it may include or couple with any device usable with an edge communication network or a combination of such networks. The components may be implemented as ICs, portions thereof, discrete electronic devices, or other modules, instruction sets, programmable logic or algorithms, HW, HW accelerators, SW, firmware, or a combination thereof adapted in the compute node 850, or as components otherwise incorporated within a chassis of a larger system. In some examples, the compute node 850 may correspond to the TPS 100 as a whole or one or more of collection agent 110, monitoring function 120, analytics function 130, decision function 140, execution function 150, and/or controlled entity 160 of FIG. 1; system 200 or an individual collection agent 210 of FIGS. 2-5; the local processing hub 650, NAN 640, data source devices 660, edge compute nodes and/or edge cloud 610 of FIG. 6; SW distribution platform 705 and/or processor platform(s) 700 of FIG. 7; and/or any other component, device, and/or system discussed herein. The compute node 850 may be embodied as a type of device, appliance, computer, or other "thing" capable of communicating with other edge, networking, or endpoint components. For example, compute node 850 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 850 includes processing circuitry in the form of one or more processors 852. The processor circuitry 852 includes circuitry such as, for example, one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 852 may include one or more HW accelerators (e.g., same or similar to acceleration circuitry 864), which may be microprocessors, programmable processing devices (e.g., FPGA, ASIC, and/or the like), or the like. The one or more accelerators may include, for example, computer vision and/or deep learning accelerators. In some implementations, the processor circuitry 852 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein. The processor circuitry 852 includes a microarchitecture that is capable of executing the µenclave implementations and techniques discussed herein. The processors (or cores) 852 may be coupled with or may include memory/storage and may be configured to execute instructions stored in the memory/storage to enable various applications or OSs to run on the platform 850. The processors (or cores) 852 is configured to operate application SW to provide a specific service to a user of the platform 850. Additionally or alternatively, the processor(s) 852 may be a special-purpose processor(s)/controller(s) configured (or configurable) to operate according to the elements, features, and implementations discussed herein.

The processor circuitry 852 may be or include, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multithreaded processor, ultra-low voltage processor, embedded processor, an XPU, a data processing unit (DPU), an Infrastructure Processing Unit (IPU), a network processing unit (NPU), and/or any other known processing elements, or any suitable combination thereof.

As examples, the processor(s) 852 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 852 may be a part of a system on a chip (SoC), System-in-Package (SiP), a multi-chip package (MCP), and/or the like, in which the processor(s) 852 and other components are formed into a single integrated circuit, or a single package, such as the Edison™ or Galileo™ SoC boards from Intel® Corporation. Other examples of the processor(s) 852 are mentioned elsewhere in the present disclosure.

The processor(s) 852 also includes one or more performance monitoring units (PMUs) 852*p*. PMU(s) 852*p* are dedicated HW elements and/or logic (e.g., virtual PMUs (vPMUs)) within a processor core that measure performance parameters and/or events to gather statistics on the operation of the processor 852 and/or memory 854. Examples of these events include instruction cycles, cache hits, cache misses, branch misses, branch mispredictions, among many others. These events can be observed and combined to create useful high-level metrics such as cycles per instruction (CPI), instructions per cycle (IPC), cycles per transaction (CPT), transactions per cycle (TPC), and/or other metrics such as any of those discussed herein. The number of HW events (e.g., performance monitoring counters) that can be collected simultaneously is based on the processor capabilities. Additionally or alternatively, PMU(s) 852*p* telemetry data/metrics may be collected by one or more SW collection element(s) (e.g., Linux™ perf, Intel® EMON, [VTune], [SEO] Telegraf, Intel® Extreme Tuning Utility (XTU), and/or the like), and upon filtering the PMU telemetry, the SW collection element(s) may detect and/or collect various metrics such as, for example, a number of unexpected events (e.g., orders of magnitude increases in machine check errors, FP underflow events, and/or the like), thermal trips, voltage drops, a number of memory errors, a number of disk errors, network data integrity exceeding accepted threshold limits, heartbeat timer expirations (e.g., no heartbeat signal received before a timer expiration), among many other data/metrics. Additional aspects of the PMU(s) 852*p* and/or performance monitoring events are discussed in INTEL® 64 AND IA-32 ARCHITECTURES SOFTWARE DEVELOPER'S MANUAL COMBINED VOLUMES: 1, 2A, 2B, 2C, 2D, 3A, 3B, 3C, 3D AND 4, Order Number: 325462-077US (April 2022), the contents of which is hereby incorporated by reference in its entirety. The computational logic 881, 882, 883 may include the aforementioned SW collection element(s) and/or any of the elements discussed previously with respect to FIGS. 1-5. The data/metrics can be made available or otherwise accessible to collection agents 110, 210 according to the various implementations discussed herein. In some implementations, the PMU(s) 852*p* may be one or more collection agents 110, 210 as discussed previously. Additionally or alternatively, the one or more collection agents 110, 210 may be the aforementioned SW collection element(s).

The processor(s) 852 communicate with system memory 854 over an interconnect (IX) 856. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Additionally or alternatively, the memory circuitry 854 is or includes block addressable memory device(s), such as those based on NAND or NOR technologies (e.g., single-level cell ("SLC"), Multi-Level Cell ("MLC"), Quad-Level Cell ("QLC"), Tri-Level Cell ("TLC"), or some other NAND).

To provide for persistent storage of information such as data, applications, OSs and so forth, a storage 858 may also couple to the processor 852 via the IX 856. In an example, the storage 858 may be implemented via a solid-state disk drive (SSDD) and/or high-speed electrically erasable memory (commonly referred to as "flash memory"). Other devices that may be used for the storage 858 include flash memory cards, such as SD cards, microSD cards, eXtreme Digital (XD) picture cards, and the like, and USB flash drives. Additionally or alternatively, the memory circuitry 854 and/or storage circuitry 858 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferro-electric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 854 and/or storage circuitry 858 can include resistor-based and/or transistor-less memory architectures. The memory circuitry 854 and/or storage circuitry 858 may also incorporate three-dimensional (3D) cross-point (XPOINT) memory devices (e.g., Intel® 3D XPoint™ memory), and/or other byte addressable write-in-place NVM. The memory circuitry 854 and/or storage circuitry 858 may refer to the die itself and/or to a packaged memory product.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

Computer program code for carrying out operations of the present disclosure (e.g., computational logic and/or instructions 881, 882, 883) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 881, 882, 883 for carrying out operations of the present disclosure may also be written in any combination of the programming languages discussed herein. The program code may execute entirely on the system 850, partly on the system 850, as a stand-alone SW package, partly on the system 850 and partly on a remote computer or entirely on the remote computer or server. In the latter scenario, the remote computer may be connected to the system 850 through any type of network, including a LAN or WAN, or the connection may be made to an external computer (e.g., through the Internet using an Internet Service Provider (ISP)).

In an example, the instructions 881, 882, 883 on the processor circuitry 852 (separately, or in combination with the instructions 881, 882, 883) may configure execution or operation of a trusted execution environment (TEE) 890. The TEE 890 operates as a protected area accessible to the processor circuitry 802 to enable secure access to data and secure execution of instructions. In some examples, the TEE 890 may be a physical HW device that is separate from other components of the system 850 such as a secure-embedded controller, a dedicated SoC, or a tamper-resistant chipset or microcontroller with embedded processing devices and memory devices. Examples of such examples include a Desktop and mobile Architecture Hardware (DASH) compliant Network Interface Card (NIC), Intel® Management/ Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 890 may be implemented as secure enclaves (or "enclaves"), which are isolated regions of code and/or data within the processor and/or memory/storage circuitry of the compute node 850. Only code executed within a secure enclave may access data within the same secure enclave, and the secure enclave may only be accessible using the secure application (which may be implemented by an application processor or a tamper-resistant microcontroller). Various implementations of the TEE 890, and an accompanying secure area in the processor circuitry 852 or the memory circuitry 854 and/or storage circuitry 858 may be provided, for instance, through use of Intel® Software Guard Extensions (SGX), ARM® Trust-Zone®, Keystone Enclaves, Open Enclave SDK, and/or the like. Other aspects of security hardening, HW roots-of-trust, and trusted or protected operations may be implemented in the device 800 through the TEE 890 and the processor circuitry 852. Additionally or alternatively, the memory circuitry 854 and/or storage circuitry 858 may be divided into isolated user-space instances such as virtualization/OS containers, partitions, virtual environments (VEs), and/or the like. The isolated user-space instances may be implemented using a suitable OS-level virtualization technologies/frameworks (e.g., Docker® containers, Kubernetes® containers, Solaris® containers/zones, containerd, Google® Container Engine, OpenVZ® virtual private servers, DragonFly BSD® virtual kernels and/or jails, chroot jails, and/or the like). Additionally or alternatively, VMs can also be used with or without virtualization container(s). Various combinations of container and orchestration technologies can be used in various implementations. In some examples, the memory circuitry 804 and/or storage circuitry 808 may be divided into one or more trusted memory regions for storing applications or SW modules of the TEE 890.

The OS stored by the memory circuitry 854 and/or storage circuitry 858 is SW to control the compute node 850. The OS may include one or more drivers that operate to control particular devices that are embedded in the compute node 850, attached to the compute node 850, and/or otherwise communicatively coupled with the compute node 850. Example OSs include consumer-based operating systems (e.g., Microsoft® Windows® 10, Google® Android®, Apple® macOS®, Apple® iOS®, KaiOS™ provided by KaiOS Technologies Inc., Unix or a Unix-like OS such as Linux, Ubuntu, or the like), industry-focused OSs such as real-time OS (RTOS) (e.g., Apache® Mynewt, Windows® IoT®, Android Things®, Micrium® Micro-Controller OSs ("MicroC/OS" or "μC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), server OSs (e.g., CentOS, Red Hat® Enterprise Linux (RHEL), Windows® Server, and/or the like), and/or the like. The OS can invoke alternate SW to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 850 may be the same or different than a second OS on a second compute node 850. For instance, the first OS may be an RTOS having particular performance expectations of responsivity to dynamic input conditions, and the second OS can include GUI capabilities to facilitate end-user I/O and the like.

The storage 858 may include instructions 883 in the form of SW, FW, and/or HW commands to implement the techniques described herein. Although such instructions 883 are shown as code blocks included in the memory 854 and the storage 858, any of the code blocks may be replaced with hardwired circuits, for example, built into an application specific integrated circuit (ASIC), FPGA memory blocks, and/or the like. In an example, the instructions 881, 882, 883 provided via the memory 854, the storage 858, or the processor 852 may be embodied as a non-transitory, machine-readable medium 860 including code to direct the processor 852 to perform electronic operations in the compute node 850. The processor 852 may access the non-transitory, machine-readable medium 860 (also referred to as "computer readable medium 860" or "CRM 860") over the IX 856. For instance, the non-transitory, CRM 860 may be embodied by devices described for the storage 858 or may include specific storage units such as storage devices and/or storage disks that include optical disks (e.g., digital versatile disk (DVD), compact disk (CD), CD-ROM, Bluray disk), flash drives, floppy disks, hard drives (e.g., SSDs), or any number of other HW devices in which information is stored for any duration (e.g., for extended time periods, permanently, for brief instances, for temporarily buffering, and/or caching). The non-transitory, CRM 860 may include instructions to direct the processor 852 to perform a specific sequence or flow of actions, for example, as described with respect to the flowchart(s) and/or block diagram(s) of operations and functionality depicted herein.

The components of edge computing device 850 may communicate over an interconnect (IX) 856. The IX 856 may represent any suitable type of connection or interface such as, for example, metal or metal alloys (e.g., copper, aluminum, and/or the like), fiber, and/or the like. The IX 856 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 856 may be a proprietary bus, for example, used in a SoC based system.

The IX 856 couples the processor 852 to communication circuitry 866 for communications with other devices, such as a remote server (not shown) and/or the connected devices 862. The communication circuitry 866 is a I-1W element, or collection of HW elements, used to communicate over one or more networks (e.g., cloud 863) and/or with other devices (e.g., connected devices 862). Communication circuitry 866 includes modem circuitry 866x may interface with application circuitry of compute node 850 (e.g., a combination of processor circuitry 802 and CRM 860) for generation and processing of baseband signals and for controlling operations of the transceivers (TRx) 866y and 866z. The modem circuitry 866x may handle various radio control functions that enable communication with one or more (R)ANs via the TRxs 866y and 866z according to one or more wireless communication protocols and/or RATs. The modem circuitry 866x may include circuitry such as, but not limited to, one or more single-core or multi-core processors (e.g., one or more baseband processors) or control logic to process baseband signals received from a receive signal path of the TRxs 866y, 866z, and to generate baseband signals to be provided to the TRxs 866y, 866z via a transmit signal path. The modem circuitry 866x may implement a real-time OS (RTOS) to manage resources of the modem circuitry 866x, schedule tasks, perform the various radio control functions, process the transmit/receive signal paths, and the like. In some implementations, the modem circuitry 866x includes a μarch that is capable of executing the μenclave implementations and techniques discussed herein.

The TRx 866y may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others.

Any number of radios, configured for a particular wireless communication protocol, may be used for the connections to the connected devices 862. For example, a wireless local area network (WLAN) unit may be used to implement Wi-Fi® communications in accordance with a [IEEE802] standard (e.g., [IEEE80211] and/or the like). In addition, wireless wide area communications, e.g., according to a cellular or other wireless wide area protocol, may occur via a wireless wide area network (WWAN) unit.

The TRx 866*y* (or multiple transceivers 866*y*) may communicate using multiple standards or radios for communications at a different range. For example, the compute node 850 may communicate with relatively close devices (e.g., within about 10 meters) using a local transceiver based on BLE, or another low power radio, to save power. More distant connected devices 862 (e.g., within about 50 meters) may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 866*z* (e.g., a radio transceiver) may be included to communicate with devices or services in the edge cloud 863 via local or wide area network protocols. The TRx 866*z* may be an LPWA transceiver that follows [IEEE802154] or IEEE 802.15.4g standards, among others. The edge computing node 863 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 866*z*, as described herein. For example, the TRx 866*z* may include a cellular transceiver that uses spread spectrum (SPA/SAS) communications for implementing high-speed communications. Further, any number of other protocols may be used, such as WiFi® networks for medium speed communications and provision of network communications. The TRx 866*z* may include radios that are compatible with any number of 3GPP specifications, such as LTE and 5G/NR communication systems.

A network interface controller (NIC) 868 may be included to provide a wired communication to nodes of the edge cloud 863 or to other devices, such as the connected devices 862 (e.g., operating in a mesh, fog, and/or the like). The wired communication may provide an Ethernet connection (see e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, among many others. In some implementations, the NIC d68 may be an Ethernet controller (e.g., a Gigabit Ethernet Controller or the like), a SmartNIC, Intelligent Fabric Processor(s) (IFP(s)). An additional NIC 868 may be included to enable connecting to a second network, for example, a first NIC 868 providing communications to the cloud over Ethernet, and a second NIC 868 providing communications to other devices over another type of network.

The connected devices 862 may be customers, clients, managing devices (e.g., servers), third parties (e.g., customers of an entity owning and/or operating the SW distribution platform 705 and/or some other device or system such as any of those discussed herein). Additionally or alternatively, connected devices 862 may operate in commercial and/or home automation environments. In some examples, a third party is a developer, a seller, and/or a licensor of SW such as the example computer readable instructions 881, 882, 883 of FIG. 8 and/or SW 760 of FIG. 7. Additionally or alternatively, the third parties may be consumers, users, retailers, OEMs, and/or other like entities that purchase and/or license the SW for use and/or re-sale and/or sub-licensing. In some examples, distributed SW (e.g., SW 760 of FIG. 7) causes display of one or more user interfaces (UIs) and/or graphical user interfaces (GUIs) to identify the one or more devices (e.g., connected devices 862) geographically and/or logically separated from each other (e.g., physically separated IoT devices chartered with the responsibility of water distribution control (e.g., pumps), electricity distribution control (e.g., relays), and/or the like).

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, and/or the like) may be embodied by such communications circuitry.

The compute node 850 can include or be coupled to acceleration circuitry 864, which may be embodied by one or more HW accelerators, a neural compute stick, neuromorphic HW, FPGAs, GPUs, SoCs (including programmable SoCs), vision processing units (VPUs), digital signal processors, dedicated ASICs, programmable ASICs, PLDs (e.g., CPLDs and/or HCPLDs), DPUs, IPUs, NPUs, and/or other forms of specialized processors or circuitry designed to accomplish one or more specialized tasks. Additionally or alternatively, the acceleration circuitry 864 is embodied as one or more XPUs. In some implementations, an XPU is a multi-chip package including multiple chips stacked like tiles into an XPU, where the stack of chips includes any of the processor types discussed herein. Additionally or alternatively, an XPU is implemented by a heterogeneous computing system including multiple types of processor circuitry (e.g., one or more FPGAs, one or more CPUs, one or more GPUs, one or more DSPs, and/or the like, and/or a combination thereof) and application programming interface(s) (API(s)) that may assign computing task(s) to whichever one(s) of the multiple types of the processing circuitry is/are best suited to execute the computing task(s). In any of these implementations, the tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 864 may comprise logic blocks or logic fabric and other interconnected resources that may be programmed (configured) to perform various functions, such as the procedures, methods, functions, and/or the like discussed herein. In such implementations, the acceleration circuitry 864 may also include memory cells (e.g., EPROM, EEPROM, flash memory, static memory (e.g., SRAM, anti-fuses, and/or the like) used to store logic blocks, logic fabric, data, and/or the like in LUTs and the like.

In some implementations, the acceleration circuitry 864 and/or the processor circuitry 852 can be or include may be a cluster of artificial intelligence (AI) GPUs, tensor processing units (TPUs) developed by Google® Inc., Real AI Processors (RAPs™) provided by AlphaICs®, Intel® Nervana™ Neural Network Processors (NNPs), Intel® Movidius™ Myriad™ X Vision Processing Units (VPUs), NVIDIA® PX™ based GPUs, the NM500 chip provided by General Vision®, Tesla® Hardware 3 processor, an Adapteva® Epiphany™ based processor, and/or the like. Additionally or alternatively, the acceleration circuitry 864 and/or the processor circuitry 852 can be implemented as AI accelerating co-processor(s), such as the Hexagon 685 DSP provided by Qualcomm®, the PowerVR 2NX Neural Net Accelerator (NNA) provided by Imagination Technologies Limited®, the Apple® Neural Engine core, a Neural Processing Unit (NPU) within the HiSilicon Kirin 970 provided by Huawei®, and/or the like.

The IX 856 also couples the processor 852 to an external interface 870 that is used to connect additional devices or subsystems. In some implementations, the interface 870 can include one or more input/output (I/O) controllers. Examples of such I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 854, storage circuitry 858, and/or IX 856 as well. The additional/external devices may include sensors 872, actuators 874, and positioning circuitry 845.

The sensor circuitry 872 includes devices, modules, or subsystems whose purpose is to detect events or changes in its environment and send the information (sensor data) about the detected events to some other a device, module, subsystem, and/or the like. Examples of such sensors 872 include, inter alia, inertia measurement units (IMU) comprising accelerometers, gyroscopes, and/or magnetometers; micro-electromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 850); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 874, allow platform 850 to change its state, position, and/or orientation, or move or control a mechanism or system. The actuators 874 comprise electrical and/or mechanical devices for moving or controlling a mechanism or system, and converts energy (e.g., electric current or moving air and/or liquid) into some kind of motion. The actuators 874 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 874 may include one or more electro-mechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The platform 850 may be configured to operate one or more actuators 874 based on one or more captured events and/or instructions or control signals received from a service provider and/or various client systems.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 845 comprises various HW elements (e.g., including HW devices such as switches, filters, amplifiers, antenna elements, and the like to facilitate OTA communications) to communicate with components of a positioning network, such as navigation satellite constellation nodes. Additionally or alternatively, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the communication circuitry 866 to communicate with the nodes and components of the positioning network. The positioning circuitry 845 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 845 is, or includes an INS, which is a system or device that uses sensor circuitry 872 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 850 without the need for external references.

In some optional examples, various input/output (I/O) devices may be present within or connected to, the compute node 850, which are referred to as input circuitry 886 and output circuitry 884 in FIG. 8. The input circuitry 886 and output circuitry 884 include one or more user interfaces designed to enable user interaction with the platform 850 and/or peripheral component interfaces designed to enable peripheral component interaction with the platform 850. Input circuitry 886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 884 may be included to show information or otherwise convey information, such as sensor readings, actuator position(s), or other like information. Data and/or graphics may be displayed on one or more user interface components of the output circuitry 884. Output circuitry 884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the platform 850. The output circuitry 884 may also include speakers or other audio emitting devices, printer(s), and/or the like. Additionally or alternatively, the sensor circuitry 872 may be used as the input circuitry 884 (e.g., an image capture device, motion capture device, or the like) and one or more actuators 874 may be used as the output device circuitry 884 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console HW, in the context of the present system, may be used to provide output and receive input of an edge computing system; to manage components or services of an edge computing system; identify a state of an edge computing component or service; or to conduct any other number of management or administration functions or service use cases.

A battery 876 may power the compute node 850, although, in examples in which the compute node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the compute node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 878 may communicate the information on the battery 876 to the processor 852 over the IX 856. The battery monitor/charger 878 may also include an analog-to-digital (ADC) converter that enables the processor 852 to directly monitor the voltage of the battery 876 or the current flow from the battery 876. The battery parameters may be used to determine actions that the compute node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the compute node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The example of FIG. 8 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed below (e.g., a mobile device in industrial compute for smart city or smart factory, among many other examples).

3. Example Implementations

FIG. 9 shows an example TRMAP process 900a, which may be operated by an ego telemetry agent. The ego telemetry agent may be the same or similar as the collector 110 of FIG. 1 and/or collection agent 210r of FIG. 2. Process 900a begins at operation 901a where the ego telemetry agent generates a request for shared telemetry data. At operation 902a, the ego telemetry agent sends or broadcasts the generated request to a set of telemetry agents deployed in a system. At operation 903a, the ego telemetry agent receives respective telemetry configuration messages from corresponding telemetry agents in the set of telemetry agents, wherein the respective telemetry configuration messages include data sharing parameters for data permitted to be shared by the corresponding telemetry agents. At operation 904a, the ego telemetry agent determines, for each telemetry configuration message among the respective telemetry configuration messages, whether to utilize the data shared by the corresponding telemetry agents based on the parameters included in the respective telemetry configuration messages. After operation 904a, process 900a may end or repeat as necessary.

FIG. 9 also shows an example TRMAP process 900b, which may be operated by an ego telemetry agent. In this example, the ego telemetry agent may be the same or similar as the collector 110 of FIG. 1 and/or collection agents 210a, 210b, 210c of FIG. 2. Process 900b begins at operation 901b where the ego telemetry agent receives a request for shared telemetry data from another telemetry agent in a set of telemetry agents. At operation 902b, the ego telemetry agent generates a telemetry configuration message to include data sharing parameters for data permitted to be shared by the ego telemetry agent. At operation 903a, the ego telemetry agent sends the telemetry configuration message to the other telemetry agent. After operation 903*a*, process 900*b* may end or repeat as necessary.

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method of operating an ego telemetry agent deployed in a system, the method comprising: sending, by the ego telemetry agent, a request for shared telemetry data to a set of telemetry agents deployed in the system; receiving, by the ego telemetry agent, respective telemetry configuration messages from corresponding telemetry agents in the set of telemetry agents, wherein the respective telemetry configuration messages include data sharing parameters for data permitted to be shared by the corresponding telemetry agents; and determining, by the ego telemetry agent for each telemetry configuration message among the respective telemetry configuration messages, whether to utilize the whether to utilize the data permitted to be shared by the corresponding telemetry agents based on the parameters included in the respective telemetry configuration messages.

Example 2 includes the method of example 1 and/or any other example(s) discussed herein, wherein the sending includes: broadcasting, by the ego telemetry agent, the request to some or all telemetry agents in the set of telemetry agents.

Example 3 includes the method of example 1 and/or any other example(s) discussed herein, wherein the sending includes: sending, by the ego telemetry agent, the request to telemetry agents in the set of telemetry agents that have opted-in to participate in data sharing.

Example 4 includes the method of example 3 and/or any other example(s) discussed herein, wherein the request includes one or more of an indication that the ego telemetry agent has opted-in to participate in the data sharing, a set of metrics to be collected by the ego telemetry agent, and a request for data sharing parameters from the set of telemetry agents.

Example 5 includes the method of examples 1-4 and/or any other example(s) discussed herein, wherein the method includes: sending, by the ego telemetry agent, the request for shared telemetry data to the set of telemetry agents on a periodic basis.

Example 6 includes the method of examples 1-5 and/or any other example(s) discussed herein, wherein the method includes: sending, by the ego telemetry agent, the request for shared telemetry data to the set of telemetry agents in response to a trigger condition.

Example 7 includes the method of example 6 and/or any other example(s) discussed herein, wherein the trigger condition is an update to a manifest of the ego telemetry agent.

Example 8 includes the method of examples 1-7 and/or any other example(s) discussed herein, wherein the data sharing parameters included in the respective telemetry configuration messages include one or more of a set of data types collected by the corresponding telemetry agents, and a data storage location in which collected data is stored by the corresponding telemetry agents.

Example 9 includes the method of example 8 and/or any other example(s) discussed herein, wherein the data sharing parameters included in the respective telemetry configuration messages include one or more of a set of data sources from which the data is collected by the corresponding telemetry agents, and a set of time periods or intervals when the corresponding telemetry agents collects data.

Example 10 includes the method of examples 1-9 and/or any other example(s) discussed herein, wherein the determining includes: comparing the data sharing parameters in the respective telemetry configuration messages with data collection parameters in a manifest of the ego telemetry agent.

Example 11 includes the method of example 10 and/or any other example(s) discussed herein, wherein the comparing includes: comparing attributes of the data sharing parameters in the respective telemetry configuration messages with attributes of the data collection parameters in the manifest of the ego telemetry agent.

Example 12 includes the method of example 11 and/or any other example(s) discussed herein, wherein the determining includes: determining utilize the data shared by the corresponding telemetry agents when the attributes of the data sharing parameters are within a predetermined or configured range of the attributes of the data collection parameters.

Example 13 includes the method of examples 11-12 and/or any other example(s) discussed herein, wherein the determining includes: determining to relinquish collection of one or more metrics specified by the manifest when the attributes of the data sharing parameters conflict with the attributes of the data collection parameters.

Example 14 includes the method of examples 10-13 and/or any other example(s) discussed herein, wherein the determining includes: determining to relinquish collection of one or more metrics specified by the manifest when parameters related to the one or more metrics are not included in the respective telemetry configuration messages.

Example 15 includes the method of examples 10-14 and/or any other example(s) discussed herein, wherein the determining includes: determining to relinquish collection of one or more metrics specified based on an analysis of data access logs related to the one or more metrics.

Example 16 includes the method of examples 10-15 and/or any other example(s) discussed herein, wherein the data collection parameters in the manifest include one or more of a set of data types to be collected, a set of data sources from which data is to be collected, sharing permissions for sharing one or more of data types of the set of data types to be collected, and a set of data storage locations for storing collected data.

Example 17 includes the method of example 16 and/or any other example(s) discussed herein, wherein the data collection parameters in the manifest include one or more of a set of time periods or intervals when data collection is to take place, a set of conditions or triggers for initiating data collection processes, and telemetry system information.

Example 18 includes the method of examples 1-17 and/or any other example(s) discussed herein, wherein the method includes: receiving, by the ego telemetry agent, another request for shared telemetry data from another telemetry agent in the set of telemetry agents; generating, by the ego telemetry agent, a telemetry configuration message to include data sharing parameters for data permitted to be shared by the ego telemetry agent; and sending, by the ego telemetry agent, the telemetry configuration message to the other telemetry agent.

Example 19 includes the method of example 18 and/or any other example(s) discussed herein, wherein the other request includes one or more of an indication that the other telemetry agent has opted-in to participate in the data sharing, a set of metrics to be collected by the other telemetry agent, and a request for data sharing parameters from ego telemetry agent.

Example 20 includes the method of examples 18-19 and/or any other example(s) discussed herein, wherein the generating includes: determining, by the ego telemetry agent, a set of metrics permitted to be shared by the ego telemetry agent, wherein the one or more metrics permitted to be shared are specified by a manifest of the ego telemetry agent; determining, by the ego telemetry agent, a set of collection attributes for each metric in the set of metrics; and generating, by the ego telemetry agent, the telemetry configuration message to include the set of metrics and the set of collection attributes for each metric in the set of metrics.

Example 21 includes the method of example 20 and/or any other example(s) discussed herein, wherein the set of collection attributes include one or more of a manner in which a corresponding metric in the set of metrics is to be collected, a data source from which the corresponding metric is collected or measured, and a data storage location in which the corresponding metric is to be stored once collected or measured.

Example 22 includes the method of examples 1-21 and/or any other example(s) discussed herein, wherein the system is a compute node, and the ego telemetry agent and the set of telemetry agents are data collection entities of respective subsystems within the compute node.

Example 23 includes the method of example 22 and/or any other example(s) discussed herein, wherein the compute node is a desktop computer, a laptop computer, a mobile device, a workstation, a network appliance, a server, an edge compute node, or a cloud compute node, the data collection entities of the respective subsystems include one or more sensors or one or more processing devices, and the data permitted to be shared by the corresponding telemetry agents include platform metrics.

Example 24 includes the method of examples 1-21 and/or any other example(s) discussed herein, wherein the system is a network or cluster of compute nodes, and the ego telemetry agent and the set of telemetry agents are data collection entities of respective subsystems within one or more compute nodes in the network or cluster of compute nodes.

Example 25 includes the method of example 24 and/or any other example(s) discussed herein, wherein the network or cluster of compute nodes includes any combination of compute nodes selected from a group comprising a desktop computer, a laptop computer, a mobile device, a workstation, a network appliance, a server, an edge compute node, and a cloud compute node, and the data permitted to be shared by the corresponding telemetry agents include platform metrics.

Example 26 includes the method of examples 1-25 and/or any other example(s) discussed herein, wherein the system includes a group of telemetry systems, and the ego telemetry agent and the set of telemetry agents are collection agents in respective telemetry systems of the group of telemetry systems.

Example 27 includes one or more computer readable media comprising instructions, wherein execution of the instructions by processor circuitry is to cause the processor circuitry to perform the method of any of examples 1-26 and/or any other example(s) discussed herein. Example 28 includes a computer program comprising the instructions of example 27 and/or any other example(s) discussed herein. Example 29 includes an Application Programming Interface defining functions, methods, variables, data structures, and/ or protocols for the computer program of example 28 and/or any other example(s) discussed herein. Example 30 includes an apparatus comprising circuitry loaded with the instructions of example 27 and/or any other example(s) discussed herein. Example 31 includes an apparatus comprising circuitry operable to run the instructions of example 27 and/or any other example(s) discussed herein. Example 32 includes an integrated circuit comprising one or more of the processor circuitry and the one or more computer readable media of example 27 and/or any other example(s) discussed herein. Example 33 includes a computing system comprising the one or more computer readable media and the processor circuitry of example 27 and/or any other example(s) discussed herein. Example 34 includes an apparatus comprising means for executing the instructions of example 27 and/or any other example(s) discussed herein. Example 35 includes a signal generated as a result of executing the instructions of example 27 and/or any other example(s) discussed herein. Example 36 includes a data unit generated as a result of executing the instructions of example 27 and/or any other example(s) discussed herein. Example 37 includes the data unit of example 36 and/or any other example(s) discussed herein, the data unit is a datagram, network packet, data frame, data segment, a Protocol Data Unit (PDU), a Service Data Unit (SDU), a message, or a database object. Example 38 includes a signal encoded with the data unit of examples 36-37 and/or any other example(s) discussed herein. Example 39 includes an electromagnetic signal carrying the instructions of example 27 and/or any other example(s) discussed herein. Example 40 includes an apparatus comprising means for performing the method of any of examples 1-26 and/or any other example(s) discussed herein.

4. Terminology

As used herein, the singular forms "a," "an" and "the" are intended to include plural forms as well, unless the context clearly indicates otherwise. The terms "comprises" and/or "comprising" as used herein specify the presence of stated features, integers, steps, operations, elements, and/or components, but do not preclude the presence or addition of one or more other features, integers, steps, operation, elements, components, and/or groups thereof. Additionally, the terms "comprising," "including," "having," and the like, as used herein, are synonymous. For the purposes of the present disclosure, the phrase "A and/or B" means (A), (B), or (A and B); and the phrase "A, B, and/or C" means (A), (B), (C), (A and B), (A and C), (B and C), or (A, B and C). Furthermore, the description may use the phrases "in an implementation", "in some implementations", "in an example," "In some examples," and the like, each of which refer to one or more of the same or different examples and/or implementations.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value. The term "measure" at least in some examples refers to a combination of data points that provide information or convey meaning.

The term "metric" at least in some examples refers to a standard definition of a quantity, produced in an assessment of performance and/or reliability of the network, which has an intended utility and is carefully specified to convey the exact meaning of a measured value. Additionally or alternatively, the term "metric" at least in some examples refers to set of events combined or otherwise grouped into one or more values. Additionally or alternatively, the term "metric" at least in some examples refers to a combination of measures or set of collected data points.

The term "telemetry" at least in some examples refers to the in situ collection or measurements, metrics, or other data and their conveyance to another device or equipment. Additionally or alternatively, the term "telemetry" at least in some examples refers to the automatic recording and transmission of data from a remote or inaccessible source to a system for monitoring and/or analysis. The term "telemeter" at least in some examples refers to a device used in telemetry, and at least in some examples, includes sensor(s), a communication path, and a control device.

The term "telemetry pipeline" at least in some examples refers to a set of elements/entities/components in a telemetry system through which telemetry data flows, is routed, or otherwise passes through the telemetry system. Additionally or alternatively, the term "telemetry pipeline" at least in some examples refers to a system, mechanism, and/or set of elements/entities/components that takes collected data from an agent and leads to the generation of insights via analytics. Examples of entities/elements/components of a telemetry pipeline include a collector or collection agent, analytics function, data upload and transport (e.g., to the cloud or the like), data ingestion (e.g., Extract Transform and Load (ETL)), storage, and analysis functions. The term "telemetry system" at least in some examples refers to a set of physical and/or virtual components that interconnect to provide telemetry services and/or to provide for the collection, communication, and analysis of data.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The term "instrumentation" at least in some examples refers to measuring instruments used for indicating, measuring, and/or recording physical quantities and/or physical events. Additionally or alternatively, the term "instrumentation" at least in some examples refers to the measure of performance (e.g., of SW and/or HW (sub)systems) in order to diagnose errors and/or to write trace information. The term "trace" or "tracing" at least in some examples refers to logging or otherwise recording information about a program's execution and/or information about the operation of a component, subsystem, device, system, and/or other entity; in some examples, "tracing" is used for debugging and/or analysis purposes.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period.

The term "identification" at least in some examples refers to a process of recognizing an identity as distinct from other identities in a particular scope or context, which may involve processing identifiers to reference an identity in an identity database.

The term "circuitry" at least in some examples refers to a circuit or system of multiple circuits configured to perform a particular function in an electronic device. The circuit or system of circuits may be part of, or include one or more HW components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and the like, that are configured to provide the described functionality. In addition, the term "circuitry" may also refer to a combination of one or more HW elements with the program code used to carry out the functionality of that program code. Some types of circuitry may execute one or more SW or firmware programs to provide at least some of the described functionality. Such a combination of HW elements and program code may be referred to as a particular type of circuitry.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, SW modules, and/or functional processes. The terms "application circuitry" and/or "baseband circuitry" may be considered synonymous to, and may be referred to as, "processor circuitry."

The term "memory" and/or "memory circuitry" at least in some examples refers to one or more HW devices for storing data, including random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, read-only memory (ROM), programmable ROM (PROM), erasable PROM (EPROM), electrically EPROM (EEPROM), flash memory, non-volatile RAM (NVRAM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The terms "machine-readable medium" and "computer-readable medium" refers to tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EE-PROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions. In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine. The terms "machine-readable medium" and "computer-readable medium" may be interchangeable for purposes of the present disclosure. The term "non-transitory computer-readable medium at least in some examples refers to any type of memory, computer readable storage device, and/or storage disk and may exclude propagating signals and transmission media.

The term "interface circuitry" at least in some examples refers to, is part of, or includes circuitry that enables the exchange of information between two or more components or devices. The term "interface circuitry" at least in some examples refers to one or more HW interfaces, for example, buses, I/O interfaces, peripheral component interfaces, network interface cards, and/or the like.

The term "SmartNIC" at least in some examples refers to a network interface controller (NIC), network adapter, or a programmable network adapter card with programmable HW accelerators and network connectivity (e.g., Ethernet or the like) that can offload various tasks or workloads from other compute nodes or compute platforms such as servers, application processors, and/or the like and accelerate those tasks or workloads. A SmartNIC has similar networking and offload capabilities as an IPU, but remains under the control of the host as a peripheral device.

The term "infrastructure processing unit" or "IPU" at least in some examples refers to an advanced networking device with hardened accelerators and network connectivity (e.g., Ethernet or the like) that accelerates and manages infrastructure functions using tightly coupled, dedicated, programmable cores. In some implementations, an IPU offers full infrastructure offload and provides an extra layer of security by serving as a control point of a host for running infrastructure applications. An IPU is capable of offloading the entire infrastructure stack from the host and can control how the host attaches to this infrastructure. This gives service providers an extra layer of security and control, enforced in HW by the IPU.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "controller" at least in some examples refers to an element or entity that has the capability to affect a physical entity, such as by changing its state or causing the physical entity to move.

The term "scheduler" at least in some examples refers to an entity or element that assigns resources (e.g., processor time, network links, memory space, and/or the like) to perform tasks. The term "network scheduler" at least in some examples refers to a node, element, or entity that manages network packets in transmit and/or receive queues of one or more protocol stacks of network access circuitry (e.g., a network interface controller (NIC), baseband processor, and the like). The term "network scheduler" at least in some examples can be used interchangeably with the terms "packet scheduler", "queueing discipline" or "qdisc", and/or "queueing algorithm".

The term "arbiter" at least in some examples refers to an electronic device, entity, or element that allocates access to shared resources and/or data sources. The term "memory arbiter" at least in some examples refers to an electronic device, entity, or element that allocates, decides, or determines when individual access/collection agents will be allowed to access a shared resource and/or data source.

The term "terminal" at least in some examples refers to point at which a conductor from a component, device, or network comes to an end. Additionally or alternatively, the term "terminal" at least in some examples refers to an electrical connector acting as an interface to a conductor and creating a point where external circuits can be connected. In some examples, terminals may include electrical leads, electrical connectors, electrical connectors, solder cups or buckets, and/or the like.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "server" at least in some examples refers to a computing device or system, including processing HW and/or process space(s), an associated storage medium such as a memory device or database, and, in some instances, suitable application(s) as is known in the art. The terms "server system" and "server" may be used interchangeably herein, and these terms at least in some examples refers to one or more computing system(s) that provide access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with, one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

The term "platform" at least in some examples refers to an environment in which instructions, program code, software elements, and the like can be executed or otherwise operate, and examples of such an environment include an architecture (e.g., a motherboard, a computing system, and/or the like), one or more HW elements (e.g., embedded systems, and the like), a cluster of compute nodes, a set of distributed compute nodes or network, an operating system, a VM, a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or HW elements in a computing system or platform including technology standards for interacts therebetween. The term "network architecture" at least in some examples refers to a physical and logical design or arrangement of software and/or HW elements in a network including communication protocols, interfaces, and media transmission.

The term "appliance," "computer appliance," and the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and the like at least in some examples refers to a computer appliance designed to protect computer networks from unwanted traffic and/or malicious attacks. The term "policy appliance" at least in some examples refers to technical control and logging mechanisms to enforce or reconcile policy rules (information use rules) and to ensure accountability in information systems.

The term "gateway" at least in some examples refers to a network appliance that allows data to flow from one network to another network, or a computing system or application configured to perform such tasks. Examples of gateways include IP gateways, Internet-to-Orbit (I2O) gateways, IoT gateways, cloud storage gateways, and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, remote terminal units (RTUs), machine-to-machine (M2M) devices, machine-type communication (MTC) devices, Internet of Things (IoT) devices, telemeters, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some examples refers to a logical entity that is a singly addressable instance of a medium access control (MAC) and physical layer (PHY) interface to the wireless medium (WM). The term "wireless medium" or WM" at least in some examples refers to the medium used to implement the transfer of protocol data units (PDUs) between peer physical layer (PHY) entities of a wireless local area network (LAN).

The term "network element" at least in some examples refers to physical or virtualized equipment and/or infrastructure used to provide wired or wireless communication network services. The term "network element" may be considered synonymous to and/or referred to as a networked computer, networking HW, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network controller" at least in some examples refers to a functional block that centralizes some or all of the control and management functionality of a network domain and may provide an abstract view of the network domain to other functional blocks via an interface.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function HW, and/or compute HW to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access HW.

The term "access point" or "AP" at least in some examples refers to an entity that contains one station (STA) and provides access to the distribution services, via the wireless medium (WM) for associated STAs. An AP comprises a STA and a distribution system access function (DSAF).

The term "electronic test equipment", "test equipment", or "testing equipment" at least in some examples refers to a device, component, or HW element (or virtualized device, component, equipment, or HW elements), or combination of devices, components, and/or HW elements, used to create analog and/or digital signals, data, instructions, commands, and/or any other means of generating an event or response at a device under test (DUT), and/or captures or otherwise receives or detects responses from the DUTs.

The term "device under test" or "DUT" at least in some examples refers to a device, component, or HW element, or a combination of devices, components, and/or HW elements undergoing a test or tests, which may take place during a manufacturing process, as part of ongoing functional testing and/or calibration checks during its lifecycle, for detecting faults and/or during a repair process, and/or in accordance with the original product specification. Additionally or alternatively, the term "system under test" or "SUT" at least in some examples refers to a system that is to be tested for correct operation. The term "device under test" or "DUT"

can be used interchangeably with the terms "equipment under test" or "EuT", "unit under test" or "UUT", "system under test" or "SUT", and the like.

The term "Transmission Reception Point" or "TRxP" at least in some examples refers to an antenna array with one or more antenna elements available to a network located at a specific geographical location for a specific area.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "colocated" or "co-located" at least in some examples refers to two or more elements being in the same place or location, or relatively close to one another (e.g., within some predetermined distance from one another). Additionally or alternatively, the term "colocated" or "co-located" at least in some examples refers to the placement or deployment of two or more compute elements or compute nodes together in a secure dedicated storage facility, or within a same enclosure or housing.

The term "central office" or "CO" at least in some examples refers to an aggregation point for telecommunications infrastructure within an accessible or defined geographical area, often where telecommunication service providers have traditionally located switching equipment for one or multiple types of access networks. In some examples, a CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines, software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some examples refers to an amount of work performed by a computing system, device, entity, and the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and the like), and/or the like. Various algorithms may be used to determine a workload and/or workload characteristics, which may be based on any of the aforementioned workload types.

The term "cloud service provider" or "CSP" at least in some examples refers to an organization which operates typically large-scale "cloud" resources comprised of centralized, regional, and Edge data centers (e.g., as used in the context of the public cloud). In other examples, a CSP may also be referred to as a "Cloud Service Operator" or "CSO". References to "cloud computing" generally refer to computing resources and services offered by a CSP or a CSO, at remote locations with at least some increased latency, distance, or constraints relative to edge computing.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s). The term "RAN function" or "RANF" at least in some examples refers to a functional block within a RAN architecture that has one or more external interfaces and a defined behavior related to the operation of a RAN or RAN node. Additionally or alternatively, the term "RAN function" or "RANF" at least in some examples refers to a set of functions and/or NFs that are part of a RAN. The term "Application Function" or "AF" at least in some examples refers to an element or entity that interacts with a 3GPP core network in order to provide services. Additionally or alternatively, the term "Application Function" or "AF" at least in some examples refers to an edge compute node or ECT framework from the perspective of a 5G core network. The term "edge compute function" or "ECF" at least in some examples refers to an element or entity that performs an aspect of an edge computing technology (ECT), an aspect of edge networking technology (ENT), or performs an aspect of one or more edge computing services running over the ECT or ENT. The term "management function" at least in some examples refers to a logical entity playing the roles of a service consumer and/or a service producer. The term "management service" at least in some examples refers to a set of offered management capabilities.

The term "network function virtualization" or "NFV" at least in some examples refers to the principle of separating network functions from the hardware they run on by using virtualization techniques and/or virtualization technologies. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed.

The term "service consumer" at least in some examples refers to an entity that consumes one or more services. The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some examples refers to a network hosting data-centric services such as, for example, operator services, the internet, third-party services, or enterprise networks. Additionally or alternatively, a DN at least in some examples refers to service networks that belong to an operator or third party, which are offered as a service to a client or user equipment (UE). DNs are sometimes referred to as "Packet Data Networks" or "PDNs". The term "Local Area Data Network" or "LADN" at least in some examples refers to a DN that is accessible by the UE only in specific locations, that provides connectivity to a specific DNN, and whose availability is provided to the UE.

The term "Internet of Things" or "IoT" at least in some examples refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces).

The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT (MQ Telemetry Transport), Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), SBMV Protocol, Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements.

The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (µTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connection-less-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (Apr. 14, 2022) and 3GPP TS 36.321 v17.0.0 (Apr. 19, 2022) (collectively referred to as "[TSMAC]")).

The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (Jan. 5, 2022) and 3GPP TS 36.201 v17.0.0 (Mar. 31, 2022)).

The term "radio technology" at least in some examples refers to technology for wireless transmission and/or reception of electromagnetic radiation for information transfer.

The term "radio access technology" or "RAT" at least in some examples refers to the technology used for the underlying physical connection to a radio based communication network.

The term "RAT type" at least in some examples may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) (and variants thereof such as HSPA Plus (HSPA+), and the like), Long Term Evolution (LTE) (and variants thereof such as LTE-Advanced (LTE-A), Evolved UTRA (E-UTRA), LTE Extra, LTE-A Pro, LTE LAA, MuLTEfire, and the like), Fifth Generation (5G) or New Radio (NR), and the like; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., *IEEE Standard for Air Interface for Broadband Wireless Access Systems, IEEE Std* 802.16-2017, pp. 1-2726 (2 Mar. 2018) ("[WiMAX]") and variants thereof), Mobile Broadband Wireless Access (MBWA)/iBurst (e.g., IEEE 802.20 and variants thereof), and the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), *IEEE Guide for Wireless Access in Vehicular Environments (WAVE) Architecture*, IEEE Standards Association, IEEE 1609.0-2019 (10 Apr. 2019) ("[IEEE16090]"), *V2X Communications Message Set Dictionary*, SAE Int'l (23 Jul. 2020) ("[J2735_202007]"), *IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments*, IEEE Std 802.11p-2010, pp. 1-51 (15 Jul. 2010) ("[IEEE80211p]"), which is now part of [IEEE80211], IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet. The term "backbone network", "backbone", or "core network" at least in some examples refers to a computer network which interconnects networks, providing a path for the exchange of information between different subnetworks such as LANs or WANs. The term "interworking" at least in some examples refers to the use of interconnected stations in a network for the exchange of data, by means of protocols operating over one or more underlying data transmission paths.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, and the like. For purposes of the present disclosure, the terms "traffic flow", "data flow", "dataflow", "packet flow", "network flow", and/or "flow" may be used interchangeably even though these terms at least in some examples refers to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "distributed computing" at least in some examples refers to computation resources that are geographically distributed within the vicinity of one or more localized networks' terminations. The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols.

The term "network service" at least in some examples refers to a composition of Network Function(s) and/or Network Service(s), defined by its functional and behavioral specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems.

The term "Quality of Service" or "QoS' at least in some examples refers to a description or measurement of the overall performance of a service (e.g., telephony and/or cellular service, network service, wireless communication/connectivity service, cloud computing service, and the like). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some examples refers to mechanisms that provide traffic-forwarding treatment based on flow-specific traffic classification. In some implementations, the term "Quality of Service" or "QoS" can be used interchangeably with the term "Class of Service" or "CoS". The term "QoS flow" at least in some examples refers to the finest granularity for QoS forwarding treatment in a network. The term "5G QoS flow' at least in some examples refers to the finest granularity for QoS forwarding treatment in a 5G System (5GS). Traffic mapped to the same QoS flow (or 5G QoS flow) receive the same forwarding treatment. The term "QoS Identifier" at least in some examples refers to a scalar that is used as a reference to a specific QoS forwarding behavior (e.g., packet loss rate, packet delay budget, and the like) to be provided to a QoS flow. This may be implemented in an access network by referencing node specific parameters that control the QoS forwarding treatment (e.g., scheduling weights, admission thresholds, queue management thresholds, link layer protocol configuration, and the like).

The term "forwarding treatment" at least in some examples refers to the precedence, preferences, and/or prioritization a packet belonging to a particular dataflow receives in relation to other traffic of other dataflows. Additionally or alternatively, the term "forwarding treatment" at least in some examples refers to one or more parameters, characteristics, and/or configurations to be applied to packets belonging to a dataflow when processing the packets for forwarding. Examples of such characteristics may include resource type (e.g., non-guaranteed bit rate (GBR), GBR, delay-critical GBR, and the like); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds;

and the like. In some implementations, the term "forwarding treatment" may be referred to as "Per-Hop Behavior" or "PHB".

The term "queue" at least in some examples refers to a collection of entities (e.g., data, objects, events, and the like) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "network path" or "path" at least in some examples refers to a data communications feature of a communication system describing the sequence and identity of system components visited by one or more packets, where the components of the path may be either logical or physical. The term "network forwarding path" at least in some examples refers to an ordered list of connection points forming a chain of NFs and/or nodes, along with policies associated to the list.

The term "traffic shaping" at least in some examples refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some examples refers to the regulation of flows into or out of a network, or into or out of a specific device or element.

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of 3GPP TS 38.300 v17.0.0 (Apr. 13, 2022) ("[TS38300]")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some examples refers to an identifier that can be mapped to a specific application or application instance; in the context of 3GPP 5G/NR systems, an "application identifier" at least in some examples refers to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer. The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment.

The term "process" at least in some examples refers to an instance of a computer program that is being executed by one or more threads. In some implementations, a process may be made up of multiple threads of execution that execute instructions concurrently.

The term "algorithm" at least in some examples refers to an unambiguous specification of how to solve a problem or a class of problems by performing calculations, input/output operations, data processing, automated reasoning tasks, and/or the like.

The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction. The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "filter" at least in some examples refers to computer program, subroutine, or other software element capable of processing a stream, data flow, or other collection of data, and producing another stream. In some implementations, multiple filters can be strung together or otherwise connected to form a pipeline.

The terms "instantiate," "instantiation," and the like at least in some examples refers to the creation of an instance. An "instance" also at least in some examples refers to a concrete occurrence of an object, which may occur, for example, during execution of program code.

The term "operating system" or "OS" at least in some examples refers to system software that manages hardware resources, software resources, and provides common services for computer programs. The term "kernel" at least in some examples refers to a portion of OS code that is resident in memory and facilitates interactions between hardware and software components.

The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload.

The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert. The term "user" at least in some examples refers to an abstract representation of any entity issuing commands, requests, and/or data to a compute node or system, and/or otherwise consumes or uses services.

The term "requestor" or "access agent" at least in some examples refers to an entity or element accessing, requesting access, or attempting to access a resource including shared resources. Examples of a "requestor" or "access agent" include a process, a task, a workload, a subscriber in a publish and subscribe (pub/sub) data model, a service, an application, a virtualization container and/or OS container, a virtual machine, a hardware subsystem and/or hardware component within a larger system or platform, a computing device, a computing system, and/or any other entity or element. The requests for access sent by a requestor or access agent may be any suitable form of request such as, for example, a format defined by any of the protocols discussed herein.

The term "cycles per instruction" or "CPI" at least in some examples refers to the number of clock cycles required to execute an average instruction. In some examples, the "cycles per instruction" or "CPI" is the reciprocal or the multiplicative inverse of the throughput or instructions per cycle (IPC). The term "instructions per cycle" or "IPC" at least in some examples refers to the average number of instructions executed during a clock cycle, such as the clock cycle of a processor or controller. In some examples, the "instructions per cycle" or "IPC" is the reciprocal or the multiplicative inverse of the CPI. The term "clock" at least in some examples refers to a physical device that is capable of providing a measurement of the passage of time. The term "duty cycle" at least in some examples refers to the fraction of one period in which a signal or system is active. The term "cycles per transaction" or "CPT" at least in some examples refers to the number of clock cycles required to execute an average transaction. In some examples, the "cycles per transaction" or "CPT" is the reciprocal or the multiplicative inverse of the throughput or transactions per cycle (TPC). The term "transactions per cycle" or "TPC" at least in some examples refers to the average number of transactions executed during a clock cycle or duty cycle. In some examples, the "transactions per cycle" or "TPC" is the reciprocal or the multiplicative inverse of the CPT. The term "transaction" at least in some examples refers to a unit of logic or work performed on or within a memory (sub) system, a database management system, and/or some other system or model. In some examples, an individual "transaction" can involve one or more operations. The term "transactional memory" at least in some examples refers to a model for controlling concurrent memory accesses to a memory (including shared memory).

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a [IEEE802] protocol/standard (e.g., [IEEE80211] or the like), and/or other like data structures.

The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content.

The term "data element" or "DE" at least in some examples refers to a data type that contains one single data. Additionally or alternatively, the term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, and the like), object instances, and/or other data elements. An "attribute" at least in some examples refers to a markup construct including a name-value pair that exists within a start tag or empty element tag. Attributes contain data related to its element and/or control the element's behavior. The term "data frame" or "DF" at least in some examples refers to a data type that contains more than one data element in a predefined order.

The term "information object" or "InOb" at least in some examples refers to a data structure or piece of information, definition, or specification that includes a name to identify its use in an instance of communication. Additionally or alternatively, the term "information object" or "InOb" at least in some examples refers to a configuration item that displays information in an organized form. Additionally or alternatively, the term "information object" or "InOb" at least in some examples refers to an abstraction of a real information entity and/or a representation and/or an occurrence of a real-world entity. Additionally or alternatively, the term "information object" or "InOb" at least in some examples refers to a data structure that contains and/or conveys information or data. Each of the data formats may also define the language, syntax, vocabulary, and/or protocols that govern information storage and/or exchange. Examples of the data formats that may be used for any of the InObs discussed herein may include Accelerated Mobile Pages Script (AMPscript), Abstract Syntax Notation One (ASN.1), Backus-Naur Form (BNF), extended BNF, Bencode, BSON, ColdFusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), Keyhole Markup Language (KML), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, Tactical Data Link (TDL) format (e.g., J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats), VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other data format and/or language discussed elsewhere herein. Additionally or alternatively, the data format for the InObs may be document and/or plain text, spreadsheet, graphics, and/or presentation formats. Additionally or alternatively, the data format for the InObs may be archive file formats and/or package file formats that store metadata and concatenate files, and may or may not compress the files for storage.

The term "reference" at least in some examples refers to data useable to locate other data and may be implemented a variety of ways (e.g., a pointer, an index, a handle, a key, an identifier, a hyperlink, and/or the like).

The term "translation" at least in some examples refers to the process of converting or otherwise changing data from a first form, shape, configuration, structure, arrangement, example, description, or the like into a second form, shape, configuration, structure, arrangement, example, description, or the like; at least in some examples there may be two different types of translation: transcoding and transformation. The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently. The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

The term "database" at least in some examples refers to an organized collection of data stored and accessed electronically. Databases at least in some examples can be implemented according to a variety of different database models, such as relational, non-relational (also referred to as "schema-less" and "NoSQL"), graph, columnar (also referred to as extensible record), object, tabular, tuple store, and multi-model. Examples of non-relational database models include key-value store and document store (also referred to as document-oriented as they store document-oriented information, which is also known as semi-structured data). A database may comprise one or more database objects that are managed by a database management system (DBMS).

The term "database object" at least in some examples refers to any representation of information that is in the form of an object, attribute-value pair (AVP), key-value pair (KVP), tuple, and the like, and may include variables, data structures, functions, methods, classes, database records, database fields, database entities, associations between data and/or database entities (also referred to as a "relation"), blocks in block chain implementations, and links between blocks in block chain implementations. Furthermore, a database object may include a number of records, and each record may include a set of fields. A database object can be unstructured or have a structure defined by a DBMS (a standard database object) and/or defined by a user (a custom database object). In some implementations, a record may take different forms based on the database model being used and/or the specific database object to which it belongs. For example, a record may be: 1) a row in a table of a relational database; 2) a JavaScript Object Notation (JSON) object; 3) an Extensible Markup Language (XML) document; 4) a KVP; and the like.

The term "data point" at least in some examples refers to a single piece of information. The term "data set" or "dataset" at least in some examples refers to a collection of data; a "data set" or "dataset" may be formed or arranged in any type of data structure. In some examples, one or more characteristics can define or influence the structure and/or properties of a dataset such as the number and types of attributes and/or variables, and various statistical measures (e.g., standard deviation, kurtosis, and/or the like).

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus comprising:
memory circuitry;
instructions; and
at least one processor circuit to be programmed based on the instructions to:
cause a request to access shared telemetry data to be sent to a set of telemetry agents;
obtain respective telemetry configuration messages from corresponding telemetry agents in the set of telemetry agents, the respective telemetry configuration messages including data sharing parameters for data permitted to be shared by the corresponding telemetry agents; and
determine whether to utilize the data permitted to be shared by the corresponding telemetry agents based on the data sharing parameters included in the respective telemetry configuration messages.

2. The apparatus of claim 1, wherein, to cause the request to be sent, one or more of the at least one processor circuit is to at least one of:
cause the request to be broadcast to one or more of the telemetry agents in the set of telemetry agents; or
cause the request to be sent to ones of the telemetry agents in the set of telemetry agents that have opted-in to participate in a telemetry redundant measurement avoidance protocol.

3. The apparatus of claim 1, wherein the apparatus is associated with a requestor agent, and the request includes at least one of an indication that the requestor agent has opted-in to participate in a telemetry redundant measurement avoidance protocol, a set of metrics to be collected by the requestor agent, or a request for collection configurations of the set of telemetry agents.

4. The apparatus of claim 1, wherein, to cause the request to be sent, one or more of the at least one processor circuit is to at least one of:
cause the request to be sent on a periodic basis; or
cause the request to be sent based on a detected trigger condition.

5. The apparatus of claim 1, wherein the data sharing parameters included in the respective telemetry configuration messages include at least one or more of a set of data types collected by the corresponding telemetry agents, a data storage location in which collected data is stored by the corresponding telemetry agents, a set of data sources from which the data is collected by the corresponding telemetry agents, or a set of at least one of time periods or intervals at which the corresponding telemetry agents collects data.

6. The apparatus of claim 1, wherein, to determine whether to utilize the data permitted to be shared by the corresponding telemetry agents, one or more of the at least one processor circuit is to:
compare attributes of the data sharing parameters in the respective telemetry configuration messages with attributes of data collection parameters in a manifest.

7. The apparatus of claim 6, wherein one or more of the at least one processor circuit is to execute the instructions to:
determine to utilize the data shared by the corresponding telemetry agents based on the attributes of the data sharing parameters being within at least one of a predetermined range or a configured range of the attributes of the data collection parameters.

8. The apparatus of claim 6, wherein one or more of the at least one processor circuit is to:
determine to relinquish collection of one or more metrics specified by the manifest based on the attributes of the data sharing parameters conflicting with the attributes of the data collection parameters.

9. The apparatus of claim 6, wherein one or more of the at least one processor circuit is to:
determine to relinquish collection of one or more metrics based on an analysis of data access logs related to the one or more metrics.

10. The apparatus of claim 6, wherein the data collection parameters in the manifest include at least one of:
a set of data types to be collected,
a set of data sources from which data is to be collected,
sharing permissions for one or more of the data types of the set of data types to be collected,
a set of data storage locations to store collected data,
a set of at least one of time periods or intervals at which data collection is to occur,
a set of at least one of conditions or triggers to initiate one or more data collection processes, or
telemetry system information.

11. The apparatus of claim 1, wherein the telemetry agents are included in a compute node, and the compute node is at least one of a desktop computer, a laptop computer, a mobile device, a workstation, a network appliance, a server, an edge compute node, or a cloud compute node.

12. The apparatus of claim 1, wherein in at least one of a network or cluster of compute nodes, and the network or cluster of compute nodes includes any combination of two or more of a desktop computer, a laptop computer, a mobile device, a workstation, a network appliance, a server, an edge compute node, or a cloud compute node.

13. One or more non-transitory computer-readable media comprising instructions to cause at least one processor circuit to at least:
cause a request to be sent to a set of collection agents, the request to be for metrics collected by the set of collection agents;
obtain, from at least one collection agent in the set of collection agents, metric sharing parameters for metrics permitted to be shared by the at least one collection agent;
access at least one of the metrics based on the metric sharing parameters; and
cause the at least one of the metrics to be sent to an analytics function.

14. The one or more non-transitory computer-readable media of claim 13, wherein the request includes at least one of an indication that a requestor agent associated with the request has opted-in to participate in metric sharing, a set of metrics to be collected by the requestor agent, or a request for collection configurations of the set of collection agents.

15. The one or more non-transitory computer-readable media of claim 13, wherein the instructions are to cause one or more of the at least one processor circuit to at least one of:
cause the request to be sent on a periodic basis; or
cause the request to be sent in response to a detected trigger condition.

16. The one or more non-transitory computer-readable media of claim 13, wherein the metric sharing parameters include at least one of a set of data types collected by the at least one collection agent, a data storage location in which data is stored by the at least one collection agent, a set of data sources from which the data is collected by the at least one collection agent, or a set of at least one of time periods or intervals at which the at least one collection agent collects data.

17. The one or more non-transitory computer-readable media of claim 13, wherein the instructions are to cause one or more of the at least one processor circuit to:

compare attributes of the metric sharing parameters with attributes of metric collection parameters in a manifest to determine to utilize the at least one metric.

18. The one or more non-transitory computer-readable media of claim 17, wherein the instructions are to cause one or more of the at least one processor circuit to:

determine to utilize the at least one metric shared by the at least one collection agent based on the attributes of the metric sharing parameters being within at least one of a predetermined range or a configured range of the attributes of the metric collection parameters.

19. The one or more non-transitory computer-readable media of claim 17, wherein the instructions are to cause one or more of the at least one processor circuit to:

determine to relinquish collection of one or more metrics specified by the manifest based on the attributes of the metric sharing parameters conflicting with the attributes of the metric collection parameters.

20. The one or more non-transitory computer-readable media of claim 17, wherein the instructions are to cause one or more of the at least one processor circuit to:

determine to relinquish collection of one or more metrics based on an analysis of data access logs related to the one or more metrics.

21. The one or more non-transitory computer-readable media of claim 17, wherein the metric collection parameters in the manifest include at least one of:

a set of metrics to be collected, a set of data sources from which metrics are to be collected, sharing permissions for one or more of the metrics of the set of metrics, a set of storage locations to store collected metrics, a set of at least one of time periods or intervals at which metric collection is to occur, a set of at least one of conditions or triggers to initiate one or more metric collection processes, or metrics collection system information.

22. A method comprising:

obtaining, by a first telemetry agent, a request for shared telemetry data from a second telemetry agent in a set of telemetry agents deployed in a system;

generating, by the first telemetry agent, a telemetry configuration message including metric sharing parameters for data permitted to be shared by the first telemetry agent; and sending, by the first telemetry agent, the telemetry configuration message to the second telemetry agent.

23. The method of claim 22, wherein the request includes at least one of an indication that the second telemetry agent has opted-in to participate in metric sharing, a set of metrics to be collected by the second telemetry agent, or a request for metric sharing parameters from the first telemetry agent.

24. The method of claim 22, wherein the generating includes:

determining, by the first telemetry agent based on a manifest, a set of metrics permitted to be shared by the first telemetry agent; and including the set of metrics and a set of collection attributes associated with the set of metrics in the telemetry configuration message.

25. The method of claim 24, wherein the set of collection attributes include at least one of a manner in which a corresponding metric in the set of metrics is to be collected, a data source from which the corresponding metric is at least one of collected or measured, or a data storage location in which the corresponding metric is to be stored.

* * * * *